United States Patent [19]

Nakai et al.

[11] Patent Number: 5,721,578
[45] Date of Patent: Feb. 24, 1998

[54] METHODS OF GRADATION CONTROL AND PICTURE QUALITY IMPROVEMENT IN A THERMAL PRINTER WHICH ADAPTS A STAGGERED PRINTING SYSTEM

[75] Inventors: Yoshiyuki Nakai; Yasushi Adachi, both of Nara; Tatsuya Tanaka, Yamatokohriyama; Toshio Takehara, Nabari; Tsuyoshi Takeno, Yamatokohriyama, all of Japan

[73] Assignee: Sharp Kabushiki Kaisha, Osaka, Japan

[21] Appl. No.: 365,072

[22] Filed: Dec. 27, 1994

[30] Foreign Application Priority Data

Dec. 27, 1993 [JP] Japan ........................... 5-332890
Jul. 6, 1994 [JP] Japan ........................... 6-154780

[51] Int. Cl.$^6$ ........................... B41J 2/355; G01D 15/10; G01D 15/16
[52] U.S. Cl. ........................... 347/183
[58] Field of Search ........................... 347/15, 183; 358/298

[56] References Cited

U.S. PATENT DOCUMENTS

| 3,230,303 | 1/1966 | Macovski et al. | |
|---|---|---|---|
| 3,922,484 | 11/1975 | Keller | 358/534 |
| 4,691,211 | 9/1987 | Brownstein | 347/180 |
| 4,974,067 | 11/1990 | Suzuki et al. | 358/534 |
| 5,109,235 | 4/1992 | Sasaki | 347/183 |
| 5,451,985 | 9/1995 | Cho | 347/183 |

FOREIGN PATENT DOCUMENTS

| 0204094 | 12/1986 | European Pat. Off. . |
| 570139 | 11/1993 | European Pat. Off. . |
| 58-126175 | 7/1983 | Japan . |
| 60-180860 | 9/1985 | Japan . |
| 63-120667 | 5/1988 | Japan . |

OTHER PUBLICATIONS

Patent Abstracts of Japan, vol. 10, No. 21, Sep. 14, 1985.

*Primary Examiner*—Mark J. Reinhart
*Assistant Examiner*—L. Anderson

[57] ABSTRACT

A gradation control method in a color thermal transfer printer is adapted to express one pixel by a dot matrix with two rows and two coles, control a density value of one dot with a time for energizing a heating element of a thermal head, and carry out mask patterning for plotting only one of four dots when the gradation of each color for one pixel is not more than a prescribed value while plotting only two of the four dots when the gradation is in excess of the prescribed value. At this time, employed is a mask pattern of necessarily plotting cyan and magenta on dots which are different from each other. A picture quality improving method in a staggered printing system is adapted to plot a noted dot when at least one of such conditions that density data of the noted dot is in excess of a prescribed density value and that density data of any of four dots most approximate to the noted dot is not more than a prescribed low density value is satisfied, even if the noted dot corresponds to that to be masked.

11 Claims, 28 Drawing Sheets

|  | MAIN SCANNING DIRECTION ADDRESS | SUB-SCANNING DIECTION ADDRESS |
|---|---|---|
| PLOT CYAN | ODD | ODD |
| PLOT MAGENTA | ODD | EVEN |

|  | MAIN SCANNING DIRECTION ADDRESS | SUB-SCANNING DIECTION ADDRESS |
|---|---|---|
| PLOT CYAN | ODD | ODD |
|  | EVEN | EVEN |
| PLOT MAGENTA | ODD | EVEN |
|  | EVEN | ODD |

METHODS OF GRADATION CONTROL AND PICTURE QUALITY IMPROVEMENT IN A THERMAL PRINTER WHICH ADAPTS A STAGGERED PRINTING SYSTEM

BACKGROUND OF THE INVENTION

1. Field of the Invention

The present invention relates to gradation control and picture quality improvement in a thermal printer, and more particularly, it relates to methods of multistage gradation control and picture quality improvement which can precisely attain desired gradations while suppressing color irregularity and reduction of the picture quality in employment of a fusion type ink ribbon. The methods of gradation control and picture quality improvement can attain an excellent effect particularly when a fusion type ink ribbon is employed in a sublimation/fusion associative thermal transfer printer.

2. Description of the Background Art

Thermal printers include thermal transfer and thermosensitive printers. Further, the thermal transfer printers are roughly classified into sublimation and fusion type thermal transfer printers.

The sublimation and fusion type thermal transfer printers are in common with each other in a principle of transferring an ink from an ink ribbon to a paper by thermal energy caused by a thermal head, which has a number of heating elements over the length of one line. However, gradation control methods employed in these thermal transfer printers are different from each other.

In the sublimation type thermal transfer printer, one pixel is formed by one dot, and a current is fed to each heating element for a time which is responsive to the gradation of corresponding pixels. Each heating element causes thermal energy which is proportionate to the time for feeding the current. A sublimation ink which is applied to the ink ribbon is gasified by this thermal energy. In this case, the volume of the ink as gasified is proportionate to the thermal energy quantity, i.e., the time for feeding the current to each heating element. The gasified ink adheres onto the paper and is solidified, thereby making printing.

Thus, it is possible to control the gradation of each pixel by adjusting the time for feeding the current to each heating element in the sublimation type thermal transfer printer. Therefore, it is possible to perform gradation control while maintaining high resolution of 12 pixels per millimeter if the thermal head of the sublimation thermal transfer printer has 12 heating elements per millimeter, for example, thereby implementing high picture quality. However, the sublimation type thermal transfer printer is high-priced and at a high running cost.

On the other hand, the fusion type thermal transfer printer is low-priced and at a lower running cost as compared with the sublimation type thermal transfer printer. In a conventional fusion type thermal transfer printer, an ink provided on an ink ribbon is fused by heating elements, so that the fused ink is transferred onto a paper in a similar manner to a decalcomania. In the conventional fusion type thermal transfer printer, therefore, it is difficult to change the gradation of each pixel including only one dot by adjusting the time for feeding a current to each heating element. Therefore, a dither pattern, for example, is utilized in order to control gradations in the fusion type thermal transfer printer.

In order to monochromatically express 64 gradations through a dither pattern, for example, one pixel is formed by a dot matrix with eight rows and eight columns. In other words, one pixel includes 64 dots. In such a pixel, it is possible to control the gradation by adjusting the number of dots onto which the ink is transferred. When area gradation control is carried out while expressing one pixel by a number of dots, however, it is difficult to reproduce natural picture data of a photograph or the like in high picture quality since resolution is reduced. When an original is formed by a halftone-dot image, a moire (interference fringe) is easily caused by interference between a halftone-dot pattern of the original and an area gradation pattern. Therefore, the fusion type thermal transfer printer is suitable for printing a business document including characters and clear graphics, rather than a natural image such as a photograph.

Under such circumstances, there has been made an attempt for improving picture quality by improving a gradation control method for one pixel in a fusion type thermal transfer printer. With recent development of working techniques, it has been made possible to extremely miniaturize heating elements which are included in a thermal head. Consequently, it has been made possible to change the area of an ink which is transferred onto a paper as one dot, by changing the time for energizing each heating element in a fusion type thermal transfer printer. While the change in area of an ink which is transferred as one dot is regarded as being local area gradation change, it is assumed that this local area gradation change is included in a density gradation throughout the specification. When gradation control is performed through such local area gradations, adjacent dots may overlap with each other if the area of the ink which is transferred as one dot is increased. Japanese Patent Laying-Open No. 63-120667 (1988) discloses a method of reducing such overlapping of adjacent dots.

FIG. 1 shows an exemplary dot pattern according to the fusion type thermal transfer method which is disclosed in Japanese Patent Laying-Open No. 63-120667 (1988). In this case, each pixel includes only one dot. A thermal head including extremely small-sized heating elements is available in recent years, whereby it is possible to control an area occupied by an ink which is transferred onto a paper within a certain range by changing the heating value of each heating element. According to Japanese Patent Laying-Open No. 63-120667 (1988), the ink is transferred to dots which are arranged in a staggered manner as described below, in order to suppress overlapping of the ink between adjacent dots.

Referring to FIG. 1, a main scanning direction is parallel to the direction of arrangement of heating elements which are included in a thermal head. A subscanning direction is along a direction for feeding a paper to be printed and an ink sheet. In a staggered printing system, even (or odd) dots are printed in a main scanning direction when an odd line along the main scanning direction is printed, while odd (or even) dots are printed when an even line is printed. In other words, every other dots are masked in each line, to cull picture data. Thus, it is possible to increase areas of dots occupied by a transferred ink while reducing overlapping of the ink between adjacent dots by arranging the dots for ink transfer in a staggered manner, thereby improving the maximum density. Referring to FIG. 1, large circles show dots in a high density region, while small circles correspond to dots expressing a substrate of low density.

According to the staggered printing system, as hereinabove described, it is possible to carry out gradation control with no remarkable reduction of resolution in the fusion type thermal transfer printer. On the other hand, Japanese Patent Laying-Open No. 58-126175 (1983) discloses that it is possible to improve picture quality also in a thermosensitive printer for making printing by heating a thermosensitive paper with a thermal head, by plotting dots in a staggered manner similarly to the fusion type thermal transfer printer. However, detailed description as to the thermosensitive printer is omitted since the staggered dot plotting in the thermosensitive printer is basically similar to that in the fusion type thermal transfer printer.

While it is possible to perform gradation control with no remarkable reduction of the resolution in the staggered printing system as described above, some problems are caused due to the staggered printing system.

For example, there is a problem of a jaggy in relation to a contour part of a picture image or a line picture image, such that the contour or a line of the picture image is jagged.

FIG. 2 shows an exemplary dot pattern according to a general printing system for printing all dots dissimilarly to the staggered printing system of masking every other dots. Comparing FIGS. 1 and 2 with each other, it is clearly understood that edges of the high density region are conspicuously jagged in the staggered printing system, as compared with the general printing system.

Another problem in the staggered printing system is that an interference fringe called a moire is easily caused by interference between cyclic patterns of halftone dots and staggered printing when a halftone dot picture image is printed. While such a moire is reduced when the halftone dot picture image is printed by the staggered printing system as compared with a case of printing the picture image through a printer performing area gradation control through a dither pattern, the moire is still conspicuous as compared with that in a sublimation thermal transfer printer employing no staggered printing system.

In the staggered printing system, further, it is necessary to successively transfer inks of yellow, magenta and cyan (and black) in a color fusion type thermal transfer printer. In a sublimation type thermal transfer printer, no problem is caused when a plurality of color inks are transferred onto one dot in an overlapping manner. Namely, an ink of a second color which is transferred onto a dot already receiving an ink of a first color is not reduced in adhesion and a combination color as obtained is a mixture of the first and second colors in the sublimation type thermal transfer printer. In the fusion type thermal transfer printer, however, uneven transfer is easily caused when a plurality of color inks are transferred onto one dot in an overlapping manner. Namely, a fusion type ink is easily varied in volume when the same overlaps on another ink which is already transferred onto a paper as compared with a case of being directly transferred onto a paper, leading to uneven transfer. Such uneven transfer is easily caused particularly when cyan and magenta inks are transferred in an overlapping manner.

The staggered printing system can provide only two patterns of printing even dots on each line and printing odd dots on each line respectively, and hence a plurality of color inks as transferred tend to overlap with each other. Further, the staggered printing system has such a disadvantage that extremely high accuracy is required for feeding the paper and the ink ribbon. Namely, overlapping of the colors is varied with slight misregistration of the ink ribbon or the paper. Even if an original has an even color pattern, therefore, color irregularity may be caused due to variation in overlapping of inks with displacement of the ink ribbon or the paper.

On the other hand, Japanese Patent Laying-Open No. 60-180860 (1985) discloses an attempt of performing multistage gradation control in a fusion type thermal transfer printer by combining area gradations through a dither pattern and density gradations (more strictly, the aforementioned local area gradations) through adjustment of the energization time for heating elements.

FIG. 3 illustrates the multistage gradation control method which is disclosed in Japanese Patent Laying-Open No. 60-180860 (1985). According to this method, each pixel includes a dot matrix with two rows and two columns. Referring to FIG. 3, the uppermost row expresses pixels on which yellow Y is printed, while second, third and fourth rows express pixels on which magenta M, cyan C and black K are printed. On the other hand, gradations of the pixels are improved from the leftmost column (a) toward the rightmost column (h). A circle in each dot section expresses the lowest ink density, while a triangle expresses ink density which is higher than that of the circle. A dot section provided with no mark expresses a dot to which no ink is transferred. In this area gradation control method, the dot pattern to which the ink must be transferred is clockwisely rotated by 90° every color.

In the gradation control method shown in FIG. 3, no ink is transferred to any of four dots in a pixel having the lowest gradation, while each ink is transferred to only one dot with the lowest density in a pixel having the next gradation, as shown in each row of the column (a). When all of the four colors are in the gradation state shown in the column (a), the most preferable printing state is attained with no overlapping of the inks, as shown in FIG. 4. In a pixel having the fifth gradation, however, each ink is printed on all of the four dots with the lowest density, as shown in the column (d). When it is necessary to print the respective colors in the gradation shown in the column (d) in one pixel, all of the four inks overlap with each other in the respective dots. When it is necessary to transfer two or more color inks to one pixel and one of the colors has a gradation which is higher than that shown in the column (d), two or more color inks overlap with each other at least in any of the dots.

In the gradation control method according to Japanese Patent Laying-Open No. 60-180860 (1985), inks of different colors inevitably overlap with each other in most cases except a case of extremely low gradations. Therefore, it is difficult to attain excellent transfer efficiency in a fusion type thermal transfer printer, and color irregularity is easily caused.

SUMMARY OF THE INVENTION

In consideration of the aforementioned prior art, an object of the present invention is to provide a method of reducing a jaggy in a gradation control method utilizing staggered printing.

Another object of the present invention is to provide a method of reducing a moire in a halftone-dot picture image in a gradation control method utilizing staggered printing.

Still another object of the present invention is to provide a method which can accurately carry out multistage gradation control in a color fusion type thermal transfer printer, without remarkably sacrificing resolution.

A further object of the present invention is to provide a gradation control method which can improve color reproducibility for a color picture image formed by a fusion type thermal transfer printer.

A further object of the present invention is to provide a gradation control method which can attain an excellent gray balance in a color fusion type thermal transfer printing employing no black ink.

According to an aspect of the present invention, a picture quality improving method in a thermal printer of controlling a density value of one dot with a time for feeding a current to a heating element of a thermal head is adapted to detect whether or not at least either one of such conditions that density data of a noted dot is in excess of a prescribed density value and that density data of any of four dots which are most approximate to the noted dot is not more than a prescribed density value is satisfied for plotting the noted dot when either condition is satisfied even if the noted dot corresponds to that to be masked, in a staggered printing system of masking odd dots for plotting only even dots in one row while masking even dots for plotting only odd dots in another row in relation to picture data of arbitrary adjacent two rows.

Namely, this method is adapted to detect whether or not at least either one of such conditions that density data of a noted dot is in excess of a prescribed density value and that density data of any of four dots which are most approximate to the noted dot is not more than a prescribed density value is satisfied for plotting the noted dot when either condition is satisfied even if the noted dot corresponds to that to be masked, whereby it is possible to reduce a jaggy in a contour part of a picture image or in a line picture.

According to another aspect of the present invention, a picture quality improving method in a thermal printer of controlling a density value of one dot with a time for feeding a current to a heating element of a thermal head is adapted to compare the maximum value of density data of three dots included in a central row with the minimum value of density data of three dots included in each of upper and lower rows in a dot matrix with three rows and three columns including a noted dot in its center for plotting the larger density value as that of the noted dot, in a staggered printing system of masking odd dots for plotting only even dots in one row while masking even dots for plotting only odd dots in another row in relation to picture data of arbitrary adjacent two rows.

Namely, this method is adapted to compare the maximum value of density data of three dots included in a central row with the minimum value of density data of three dots included in each of upper and lower rows in a dot matrix with three rows and three columns including a noted dot in its center for plotting the larger density value as that of the noted dot, whereby it is possible to reduce a moire in a halftone-dot picture image.

According to still another aspect of the present invention, a gradation control method in a color thermal transfer printer is adapted to express one pixel by a dot matrix with two rows and two columns, control a density value of one dot with a time for feeding a current to a heating element of a thermal head, and carry out mask patterning for plotting only one of four dots when the gradation of each color for one pixel is not more than a prescribed value while plotting only two of the four dots when the gradation is in excess of the prescribed value.

Namely, area gradation control through the dot matrix is combined with density gradation control through the time for energizing the heating element of the thermal head while it is possible to extremely reduce overlapping of color inks having different mask patterns, whereby multistage gradation control can be carried out without remarkably sacrificing resolution.

According to a further aspect of the present invention, a gradation control method utilizes such a mask pattern that cyan and magenta are necessarily plotted on dots which are different from each other.

Namely, cyan and magenta are necessarily plotted on dots which are different from each other, whereby it is possible to improve color reproducibility of a printed color image.

According to a further aspect of the present invention, a gradation control method is adapted to set an energization time for plotting magenta on the basis of an energization start time when a time for energizing a heating element for plotting cyan is set on the basis of an energization end time while setting an energization time for plotting magenta on the basis of an energization end time when an energization time for plotting cyan is set on the basis of an energization start time, for controlling a density value of one dot with a time for feeding a current to a heating element of a thermal head.

Namely, the reference time for the energization time for plotting cyan is different from that for the energization time for plotting magenta, whereby it is possible to reduce overlapping of cyan and magenta for attaining an excellent gray balance when no black ink is employed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
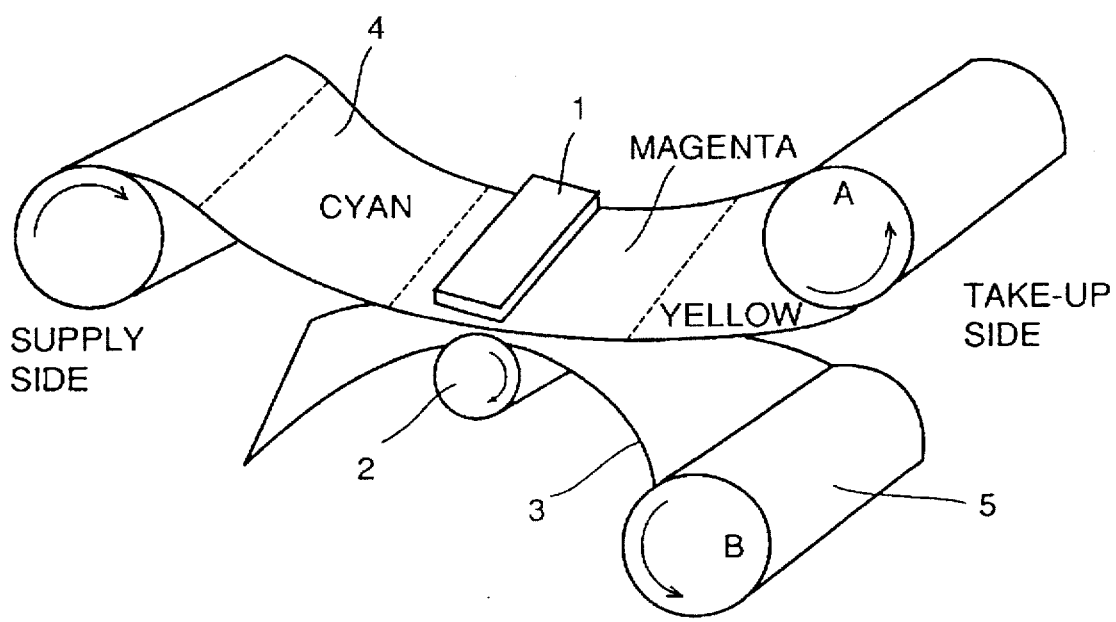
FIG. 5 is a schematic perspective view showing a principal part of a thermal transfer printer.

FIG. 5 is a schematic perspective view showing an exemplary principal part of a color thermal transfer printer employable in a gradation control system to which the present invention is applied. A paper 3 and an ink ribbon 4 are held between a thermal head 1 and a platen 2. The thermal head 1 presses the ink ribbon 4 against the paper 3.

The thermal head 1 includes a number of heating elements which are linearly arranged in correspondence to the number of dots for one line. When the maximum printing size is the A4 size, for example, the heating elements are arranged over the length of the A4 size. The heating elements are arranged at a pitch corresponding to the resolution of the printer. When the printer has resolution of 12 dots per millimeter, for example, 12 heating elements are arranged every millimeter. When a current is fed to these heating elements, inks provided on the ink 4 are fused by heat which is generated from the heating elements, and transferred onto the paper 3. The ink ribbon 4 periodically includes three (or four) color inks of yellow, magenta and cyan (and black).

The present invention is mainly aimed at improving gradation control and picture quality in a color fusion thermal transfer printer, while the inventive gradation control and picture quality improving methods can provide excellent effects particularly in gradation control of fusion thermal transfer in a sublimation/fusion associative thermal transfer printer. When fusion type thermal transfer is carried out in a sublimation/fusion associative thermal transfer printer, it is possible to provide a switch for automatically selecting sublimation and fusion modes by changing a sublimation ink ribbon cartridge and a fusion type ink ribbon cartridge.

The heating elements provided in the thermal head 1 generate heat in response to the width of a pulse which is outputted from a pulse generation part (not shown in FIG. 5). The ink ribbon 4 is taken up by a DC motor (not shown in FIG. 5) at the same speed as that for the paper 3. An end of the paper 3 is clamped by a drum 5, so that the paper 3 is moved between the thermal head 1 and the platen 2 at the same constant speed as that for the ink ribbon 4, due to rotation of the drum 5 shown by arrow. The paper 3 is reciprocated three (or four) times in response to the number of the colors provided on the ink ribbon 4, so that the respective colors of yellow, magenta and cyan (and black) are successively transferred thereto.

Figure 6:
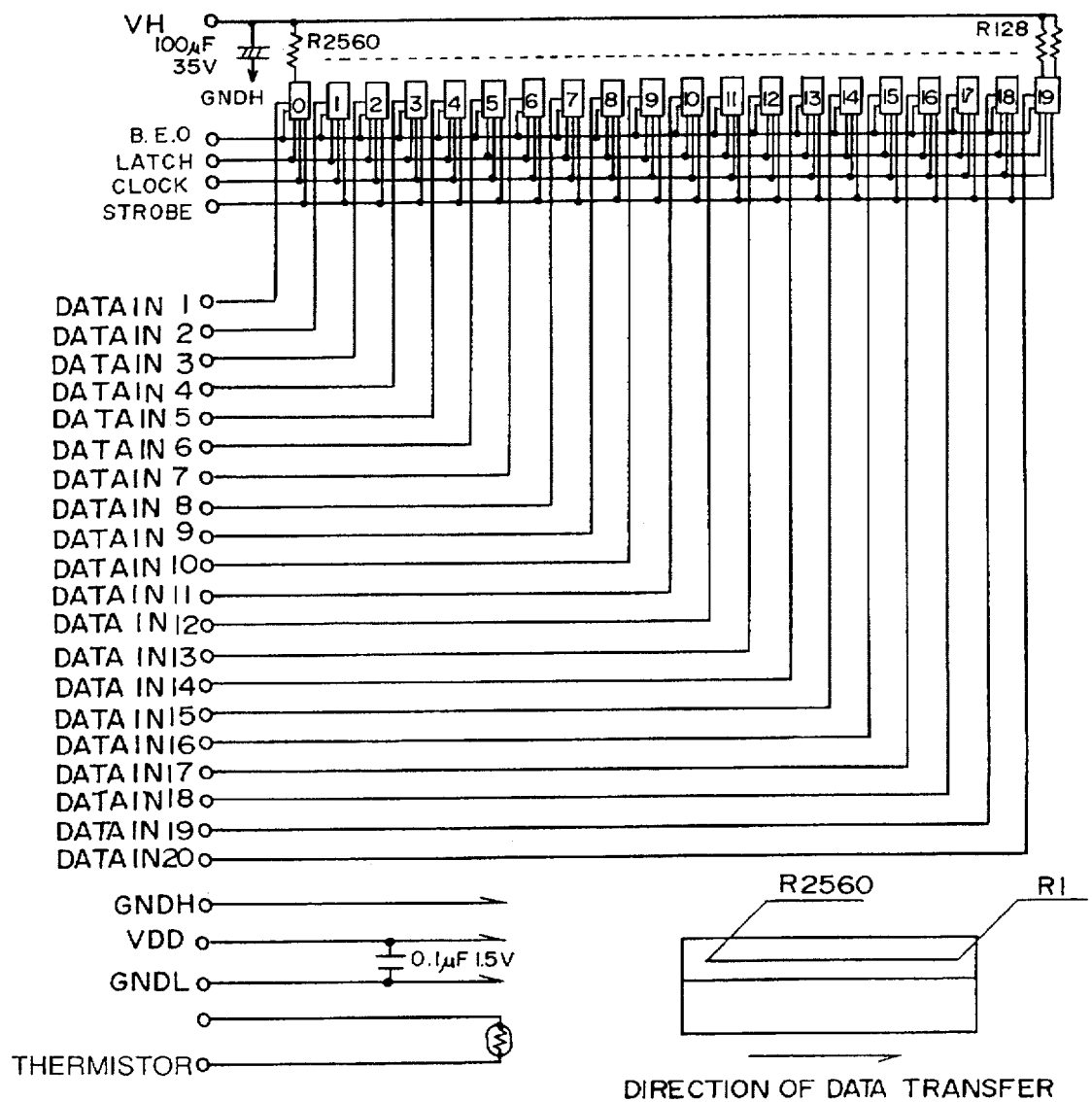
FIG. 6 is a circuit diagram showing the structure of a thermal head.
Figure 7:
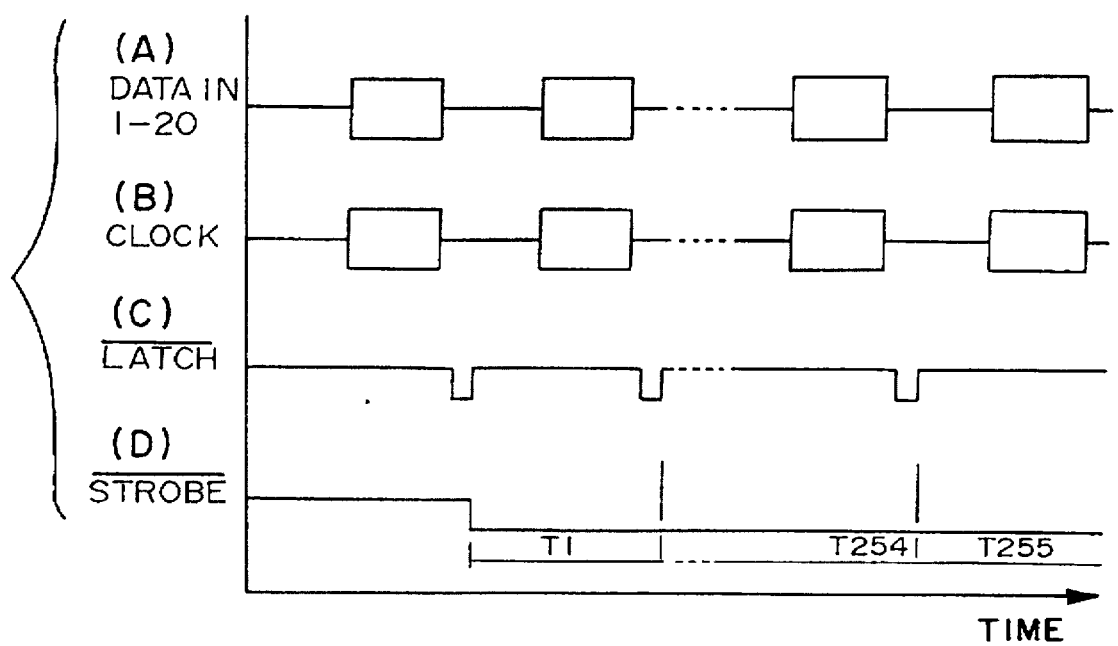
FIG. 7 is a timing chart for controlling the thermal head shown in FIG. 6.

FIG. 6 is a circuit diagram showing the internal structure of the thermal head 1, and FIG. 7 is a timing chart for controlling the thermal head 1 shown in FIG. 6. Printing data ("1" or "0") are inputted in synchronization with a signal CLOCK as signals DATA IN 1 to DATA IN 20. A signal LATCH is rendered effective after the signal CLOCK is generated 120 times. The printing data are stored in the thermal head 1 due to this control. Then, a signal STROBE is rendered effective in a constant period. Thus, those of the heating elements storing the printing data "1" generate heat in the thermal head 1. The above operation is repeated a required number of times, to enable gradation control. Namely, the energization time for the heating elements is increased (the number of times for "1" is increased) in order to improve density values of dots.

While it is possible to attain a density value which is correctly proportionate to the energization time for the heating elements in each dot in relation to a sublimation type ink, however, it is difficult to accurately express multistage gradations in relation to a fusion type ink, dissimilarly to the sublimation type ink. In a fusion type ink ribbon, inks are not fused unless its temperature is increased in excess of a prescribed value. When 256 gradations are expressed, therefore, the dot diameter is extremely increased in order to print the maximum density. According to the present invention, therefore, not all dots are plotted but positions of dots to be printed are limited through masking. In other words, dots are plotted in accordance with a staggered pattern in principle in a picture quality improving method according to the present invention.

Figure 8:
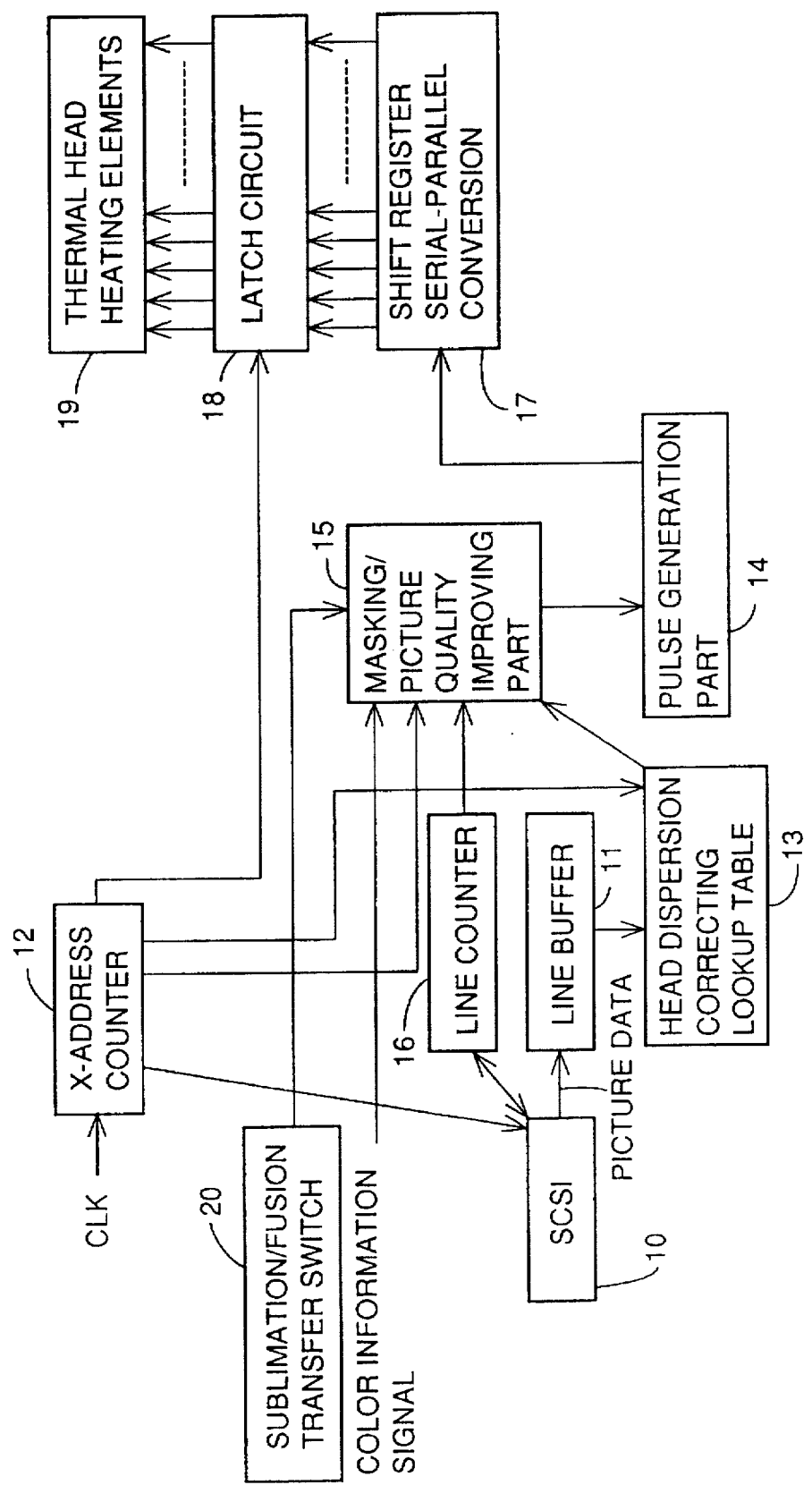
FIG. 8 is a block diagram showing a control system employed in thermal transfer printing for carrying out the present invention.

FIG. 8 is a schematic block diagram showing an exemplary control system which is employed in a thermal transfer printer for carrying out the picture quality improving method according to the present invention. In this system, picture data are transferred from a host computer to the printer by an SCSI (small computer system interface) 10. The picture data are transferred in order of yellow, magenta and cyan. After data of an overall screen are transferred as to each color, data of a next color are transferred. However, the present invention is also applicable to monochromatic printing, as a matter of course. The picture data are formed by eight bits every color. A line buffer 11 provided in the printer stores picture data for one line.

An X address counter 12 is provided for forming addresses of picture data in a main scanning direction (direction of arrangement of the heating elements) in synchronization with the transfer of the picture data. An output of the X address counter 12 is inputted in an address of a head dispersion correcting lookup table 13. This head dispersion correcting lookup table 13 also receives picture data from the line buffer 11, for correcting dispersion which is related to resistance values of respective heating elements provided in a thermal head 19. The picture data as corrected are inputted in a masking/picture quality improving part 15.

The masking/picture quality improving part 15 carries out masking and picture quality improvement in accordance with the present invention. A picture signal processed in the masking/picture quality improving part 15 is inputted in a pulse generation part 14. The pulse generation part 14 is adapted to generate timing for turning on the heating elements of the thermal head 19, in response to values of the picture data. A pulse signal generated from the pulse generation part 14 is inputted in a shift register 17. The pulse signal for one line which is inputted in the shift register 17 is serial-parallel converted so that energization signals are inputted in a latch circuit 18 by the number of the heating elements provided in the thermal head 19. The latch circuit 18 is latched by a latch signal which is outputted from the X address counter 12, so that energization pulse signals corresponding to respective dots energize the heating elements provided in the thermal head 19 in response to the picture data. Temperatures of the heating elements provided in the thermal head 19 are increased in response to the energization time, so that inks provided on a fusion type ink ribbon are fused and transferred onto a paper.

As hereinabove described, it is possible to implement the picture quality improving method in the gradation control system to which the present invention is applied by properly incorporating the masking/picture quality improving part 15 in the control system for the general thermal transfer printer. Description is now made on various embodiments of the inventive picture quality improving method mainly in relation to the masking/picture quality improving part.

Figure 9:
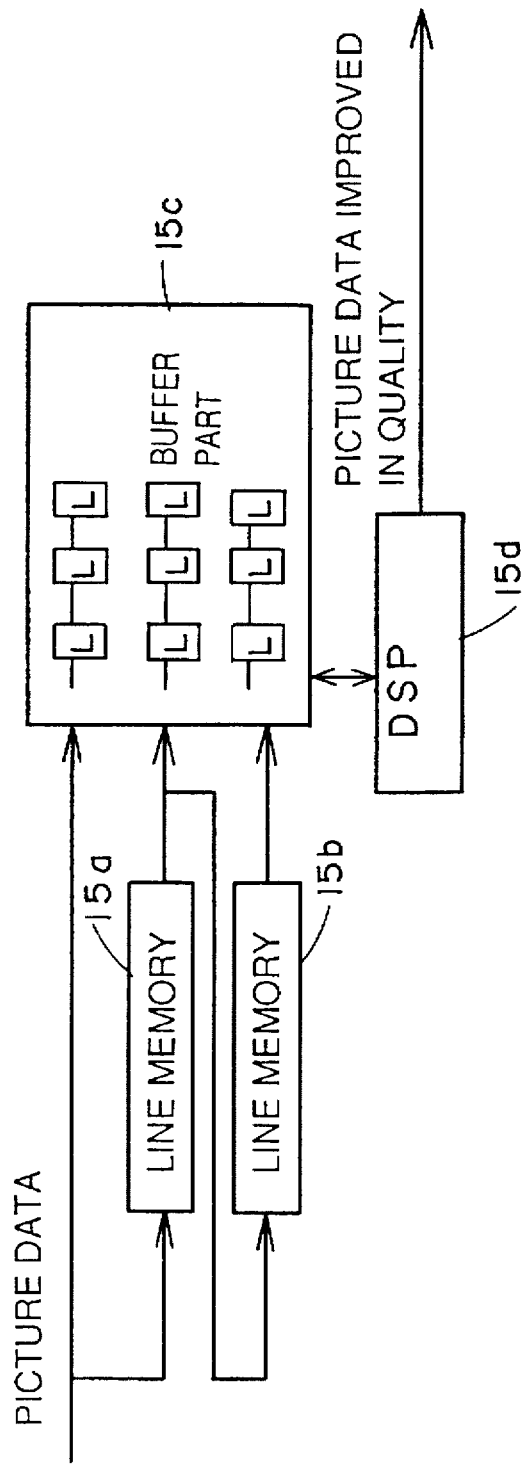
FIG. 9(A) is a block diagram showing a principal part of a masking/picture quality improving part shown in FIG. 8.
FIG. 9(B) illustrates a dot matrix.

FIG. 9(A) is a block diagram showing a principal part of a masking/picture quality improving part 15 according to a first embodiment of the present invention. In this masking/picture quality improving part 15, line memories 15a and 15b delay picture data line by line respectively. Namely, it is possible to simultaneously input picture data of three dots in the same column along a subscanning direction in picture data of three lines along a main scanning direction in a buffer part 15c, by employing the two line memories 15a and 15b. The buffer part 15c includes three latches L in each of three lines. Each latch L can latch picture data of one dot which is expressed in eight bits, whereby nine dots A to I which are arranged in a matrix with three rows and three coles can be latched as shown in FIG. 9(B). It is possible to read out the picture data which are related to the nine dots by a digital signal processor (hereinafter referred to as "DSP") 15d serving as arithmetic means. Picture data which is improved in quality by the DSP 15d is inputted in the pulse generation part 14 shown in FIG. 8 as data for the central dot E noted in the matrix shown in FIG. 9(B).

Figure 10:
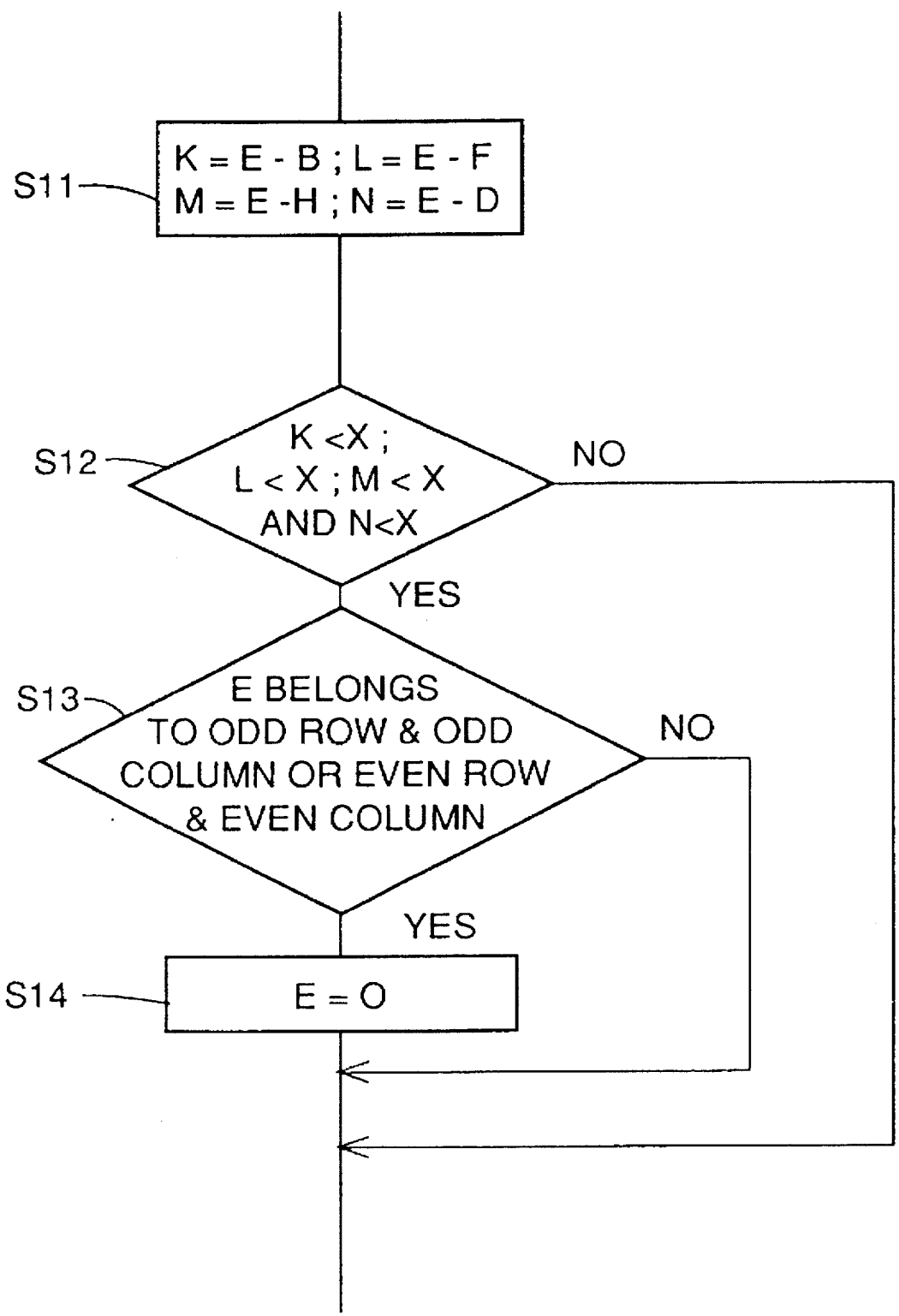
FIG. 10 is a flow chart for illustrating a picture quality improving method according to an embodiment of the present invention.

FIG. 10 is a flow chart showing the procedure of the picture quality improvement which is carried out in the DSP 15d. First, differences (hereinafter referred to as "edge density differences") K, L, M and N between density data of the noted dot E and those of four dots B, D, F and H which are most approximate thereto in FIG. 9(B) are calculated at a step S11.

Then, the respective edge density differences K, L, M and N are compared with a certain reference value X at a step S12. If at least one of the density edge differences K, L, M and N exceeds the reference value X, the density data of the dot E is inputted in the pulse generation part 14 as such. If all edge density differences K, L, M and N are smaller than the reference value X, on the other hand, the process advances to a step S13.

If the dot E belongs to an odd row and an odd column or an even row and an even column to be masked at the step S13, the process advances to a step S14, so that the density data of the dot E is set at zero. Namely, the dot E is masked and not plotted. If the dot E is in a position of an odd row and an even column or an even row and an odd column at the step S13, on the other hand, picture data of the dot E is outputted to the pulse generation part 14 as such.

Figure 1:
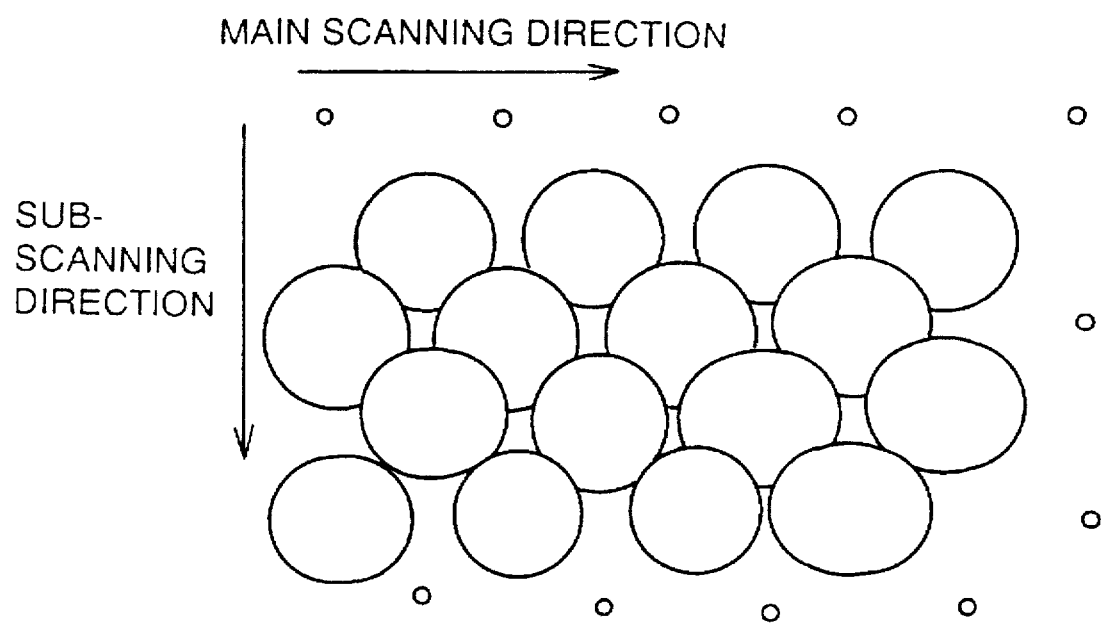
FIG. 1 illustrates a conventional dot pattern which is masked in a staggered manner.
Figure 2:
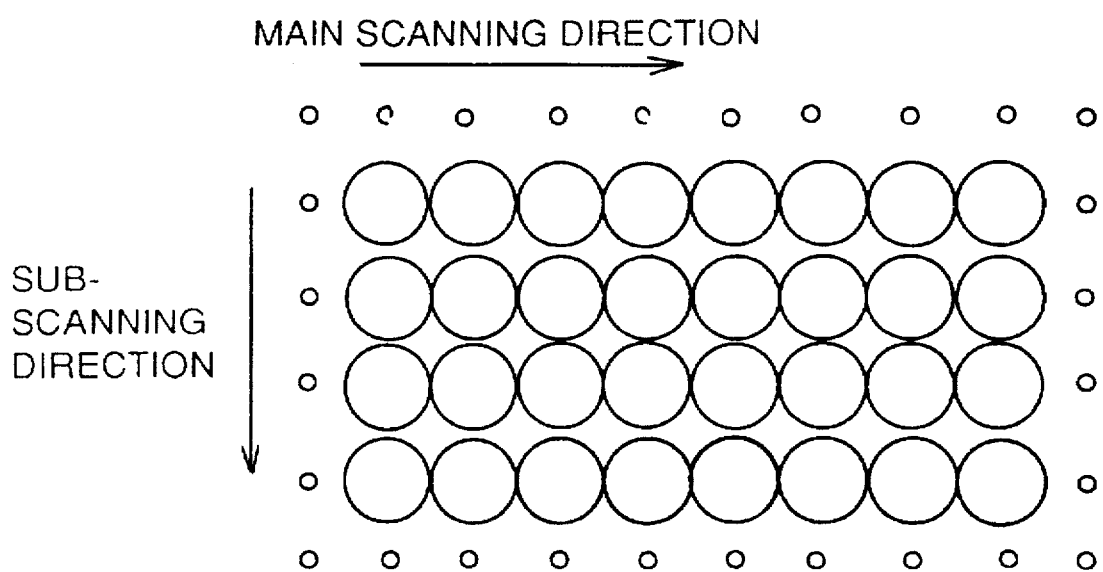
FIG. 2 illustrates a dot pattern in which all dots are plotted.
Figures 3, 4:
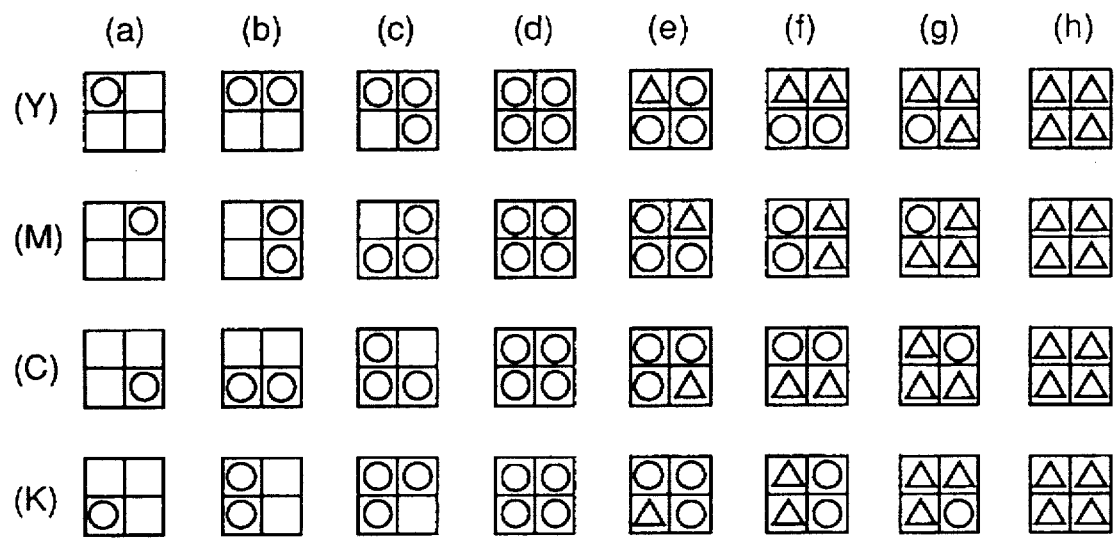
FIG. 3 illustrates dot mask patterns showing a conventional gradation control method in a color fusion type thermal transfer printer.
FIG. 4 illustrates a plot pattern of the most preferable printing state in the gradation control method shown in FIG. 3.
Figure 11:
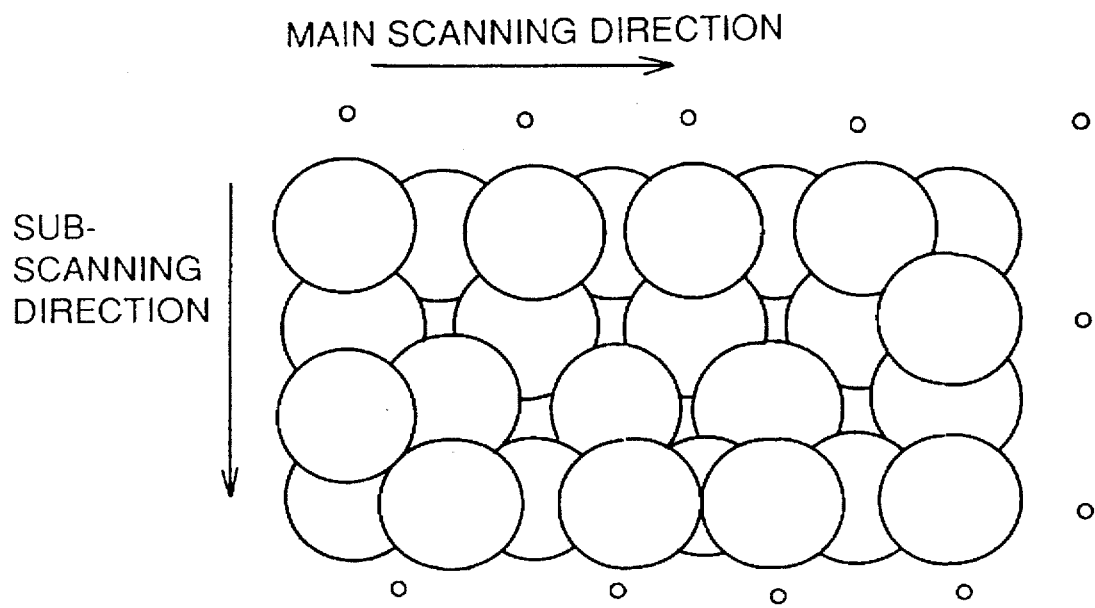
FIG. 11 illustrates a dot pattern showing an effect of the picture quality improving method according to the embodiment shown in FIG. 10.

FIG. 11 illustrates an exemplary dot pattern which is plotted through the processing shown in FIG. 10. Comparing this figure with FIG. 1, a jaggy is extremely reduced in a contour part of the picture image appearing in FIG. 11.

As hereinabove described, it is understood possible to remarkably reduce the jaggy by the relatively simple processing shown in FIG. 10. While the noted dot E is masked when the same is in a position of an odd row and an odd column or an even row and an even column at the step S13 shown in FIG. 10, this dot E may alternatively be masked when the same is in a position of an odd row and an even column or an even row and an odd column f as a matter of course.

A second embodiment of the present invention is now described with reference to FIG. 12. The second embodiment is similar to the first embodiment, except a processing method in the DSP. At a step S21 shown in FIG. 12, a determination is made as to whether or not the density data of the central noted dot E in the dot matrix shown in FIG. 9(B) is at the maximum value of 255 (highest density value). If the density data of the dot E is at the maximum value, the density value 255 is inputted in the pulse generation part 14 as the density value of the dot E. If the density data of the dot E is less than 255, on the other hand, the process advances to a step S22.

At the step S22, a determination is made as to whether or not the density data of the four dots B, D, F and H which are most approximate to the noted dot E are at the minimum value of 0 (lowest density value). If at least one of the four dots B, D, F and H has the minimum density data 0, the density data of the noted dot E is inputted in the pulse generation part 14 as such. If all of the four dots B, D, F and H have density data which are larger than the minimum value 0, on the other hand, the process advances to a step S23.

The steps S23 and S24, which are similar to the steps S13 and S14 in FIG. 10, are adapted to perform staggered masking processing similarly to that of the first embodiment.

Figure 12:
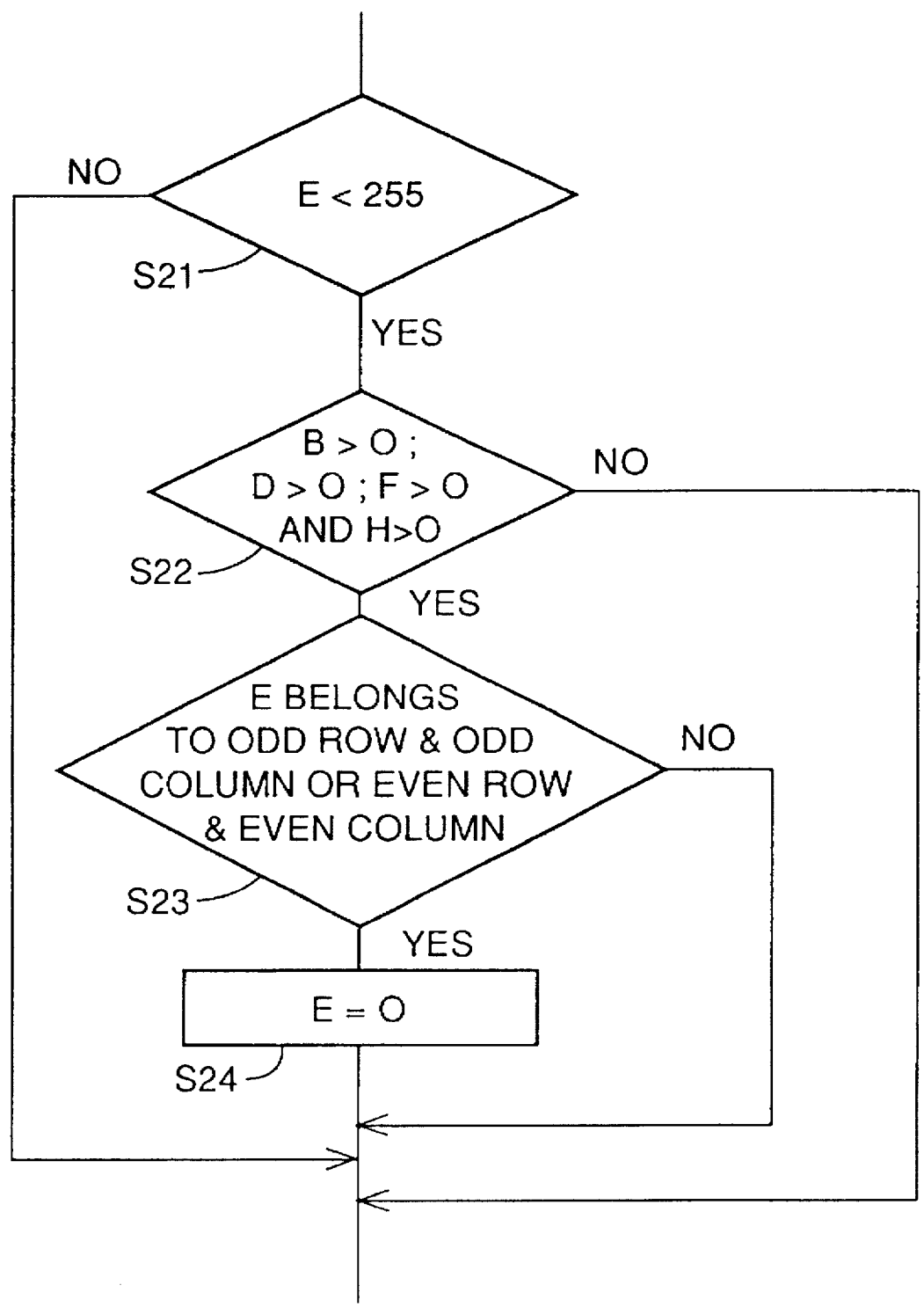
FIG. 12 is a flow chart for illustrating a picture quality improving method according to another embodiment of the present invention.

The embodiment shown in FIG. 12 is further effective for reducing a jaggy when pale characters or a line picture is provided on a white substrate or dark characters are expressed on a dark substrate, as compared with the embodiment shown in FIG. 10.

A third embodiment of the present invention is now described. The third embodiment is similar to the first and second embodiments, except processing in the DSP. While the first and second embodiments are adapted to reduce jaggies from printed picture images, the third embodiment is adapted to reduce a moire.

A median filter is known as a filter which is effective for reducing a moire. The median filter is adapted to output median values of a noted dot and peripheral dots, as understood from its name. Although the median filter is effective for reducing a moire, however, a thin line tends to disadvantageously disappear by this filter. When a horizontal line, which is assumed to have the maximum density value 255, of a 1-dot width is present on a substrate of a density value 0 through the central noted dot E (see FIG. 9(B)), for example, values of density data related to the nine dots of three rows and three columns including the noted dot E in the center are (0; 0; 0; 255; 255; 255; 0; 0; 0), and the thin line disadvantageously disappears through a median value of zero. Further, the median filter requires much time for filtering.

Figure 13:
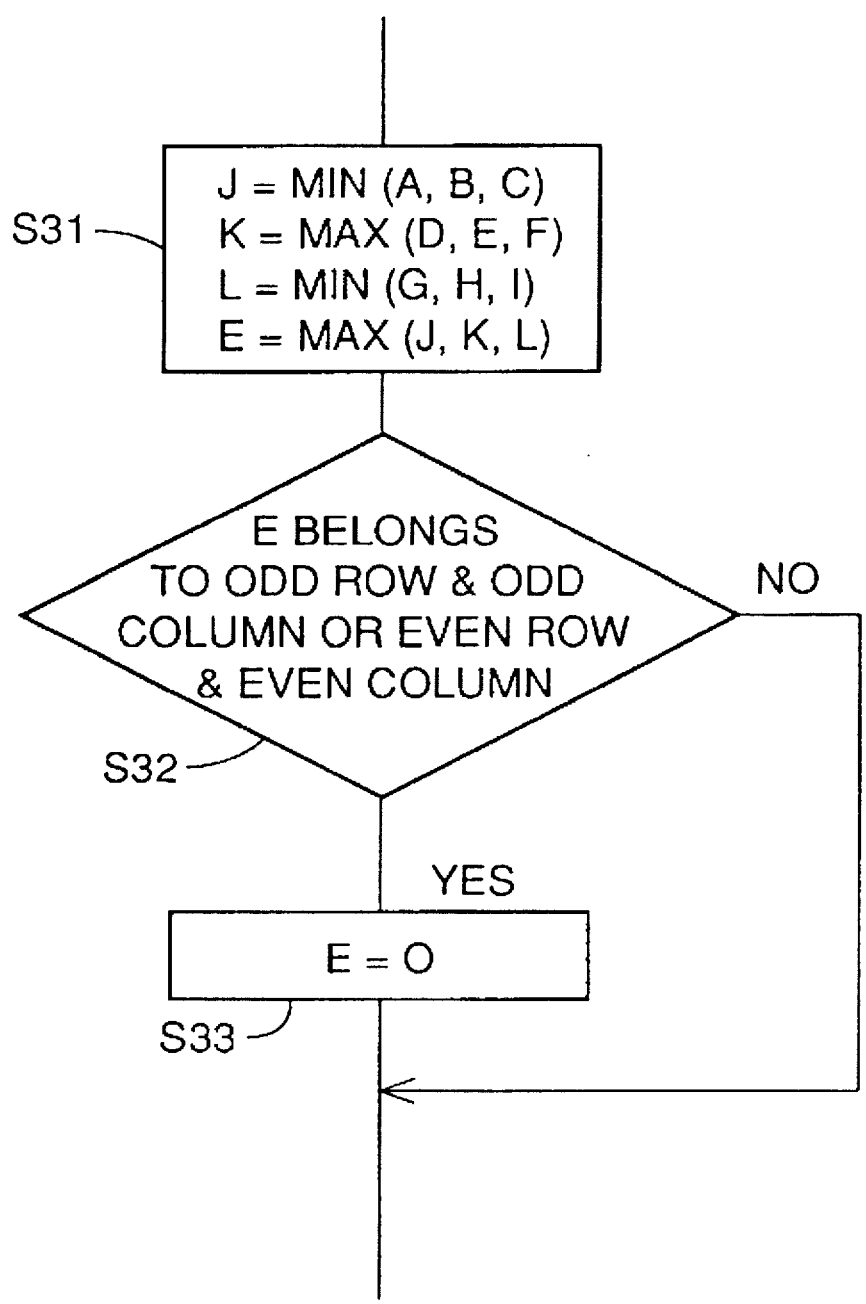
FIG. 13 is a flow chart for illustrating a picture quality improving method according to still another embodiment of the present invention.

FIG. 13 is a flow chart showing a procedure in the DSP according to the third embodiment of the present invention which is adapted to reduce a moire. At a step S31, density data of three dots on the same line are compared with each other in the dot pattern of three rows and three columns shown in FIG. 9(B). In the central row including the three dots D, E and F, the maximum density value is employed as a typical density value K of this row. In the upper row including the dots A, B and C, the minimum density value is employed as a density value J representing this row. Similarly in the lower row including the dots G, H and I, the minimum density value is employed as a density value L representing this row. The maximum value of these three typical density values J, K and L is employed as the density value of the noted dot E. Thereafter the aforementioned staggered masking is performed at steps S32 and S33, so that the picture data as processed are inputted in the pulse generation part 14 shown in FIG. 8. According to the processing of the third embodiment, it is possible to remarkably reduce a moire in a halftone-dot picture image also when staggered masking is performed.

Figure 14:
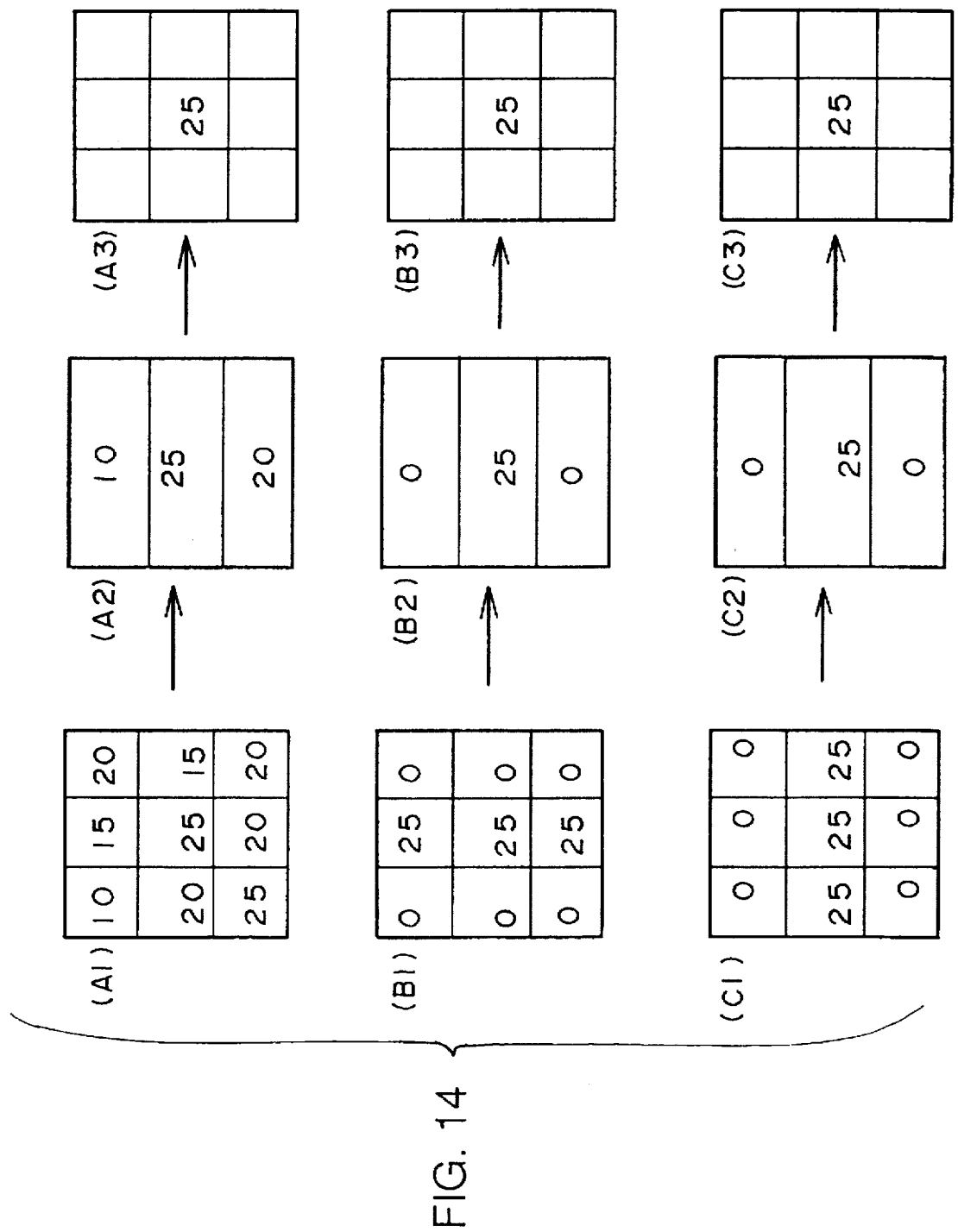
FIG. 14 illustrates density patterns for illustrating an effect of the embodiment shown in FIG. 13.

With reference to FIG. 14, the effect of the embodiment shown in FIG. 13 is now described in further detail in comparison with the effect of the median filter. In a density pattern of three rows and three columns shown at (A1) in FIG. 14, the minimum density values in the upper, central and lower rows are 10, 25 and 20 respectively. As shown in a density pattern at (A2), therefore, typical density values of the upper, central and lower rows are 10, 25 and 20 respectively. As shown in a density pattern at (A3), therefore, the maximum value of 25 is outputted as the density data of the noted dot E.

In a density pattern shown at (B1) in FIG. 14, a vertical line of a 1-dot width passes through the central dot E. This vertical line disappears when the density pattern is applied to a median filter. According to the embodiment shown in FIG. 13, however, typical density values J, K and L of the upper, central and lower rows are 0, 25 and 0 respectively as shown at (B2) in FIG. 14. As shown at (B3), therefore, the maximum value of 25 is outputted as the density value of the noted dot E.

A density pattern having a horizontal line of a 1-dot width passing through the central dot E is shown at (C1) in FIG. 14. This horizontal line also disappears through a medium filter, since the median value of this density pattern is 0. According to the embodiment shown in FIG. 13, however, typical density values J, K and L of the upper, central and lower rows are 0, 25 and 0 respectively, as shown at (C2) in FIG. 14. As shown at (C3), therefore, the maximum value of 25 in these values J, K and L is outputted as the density data of the noted dot E.

Figure 15:
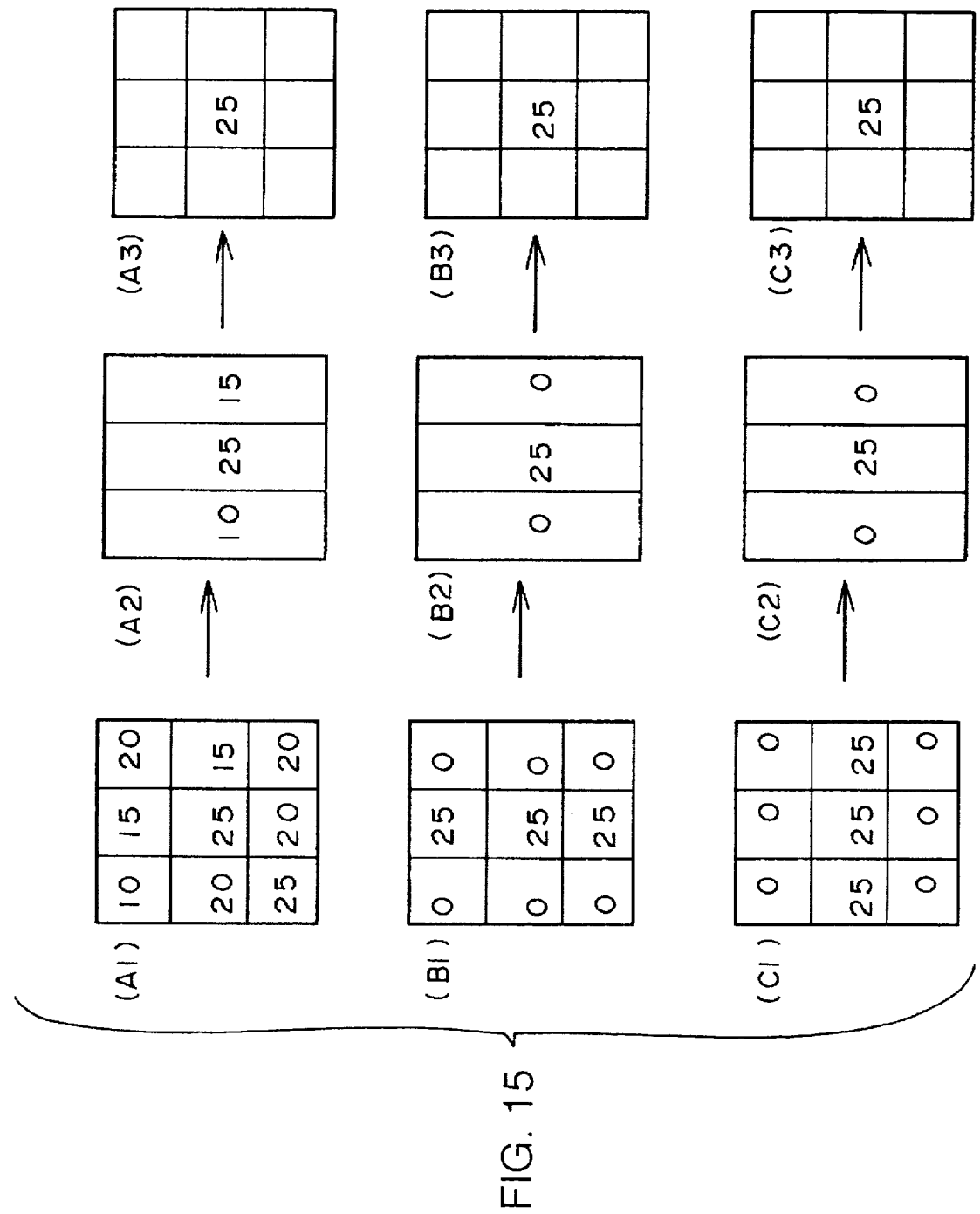
FIG. 15 illustrates density patterns for illustrating another effect of the embodiment shown in FIG. 13.

While typical density values of three rows are compared with each other in FIGS. 13 and 14, it is also possible to attain a similar effect by comparing typical density values of three columns, as shown in FIG. 15. In a density pattern shown at (A1) in FIG. 15, for example, the minimum density value in the left column, the maximum density value in the central column and the minimum density value in the right column are 10, 25 and 15 respectively as shown at (A2). As shown at (A3) in FIG. 15, therefore, the maximum value of 25 in the typical density values of the three columns is outputted as the density data of the noted dot E.

When a vertical line of a 1-dot width is present to pass through the central dot E as shown in a density pattern at (B1) in FIG. 15, typical density values of left, central and right columns are 0, 25 and 0 respectively, as shown at (B2). Therefore, the maximum density value of 25 in the three columns is outputted as the density data of the noted dot E, as shown at (B3) in FIG. 15.

Also when a horizontal line of a 1-dot width passes through the central dot E as shown in a density pattern at (C1) in FIG. 15, the typical minimum density value, the typical maximum density value and the typical minimum density value of left, central and right columns are 0, 25 and 0 respectively, as shown at (C2). Therefore, the maximum density value of 25 in the three columns is outputted as the density data of the noted dot E, as shown at (C3) in FIG. 15.

Figure 16:
FIGS. 16(A1)–16(B3) illustrate dot matrices including specific density distributions.

A fourth embodiment of the present invention is now described. The fourth embodiment is similar in basic structure to the first to third embodiments, while the content of processing in the DSP is changed. Before describing the fourth embodiment in detail, the reason why this embodiment is desired is briefly explained. It has been clarified that a moire in a printed picture image is reduced in the embodiment shown in FIG. 13. When the moire reduction shown in FIG. 13 is performed on each of relatively specific density patterns shown in FIG. 16, however, a value 25 may be outputted although zero is preferably outputted as the density data of the noted dot E, such that a white thin line disappears or a thin line having a certain density value is thickened by a 1-dot width as the result. The fourth embodiment can solve this problem.

Figure 17:
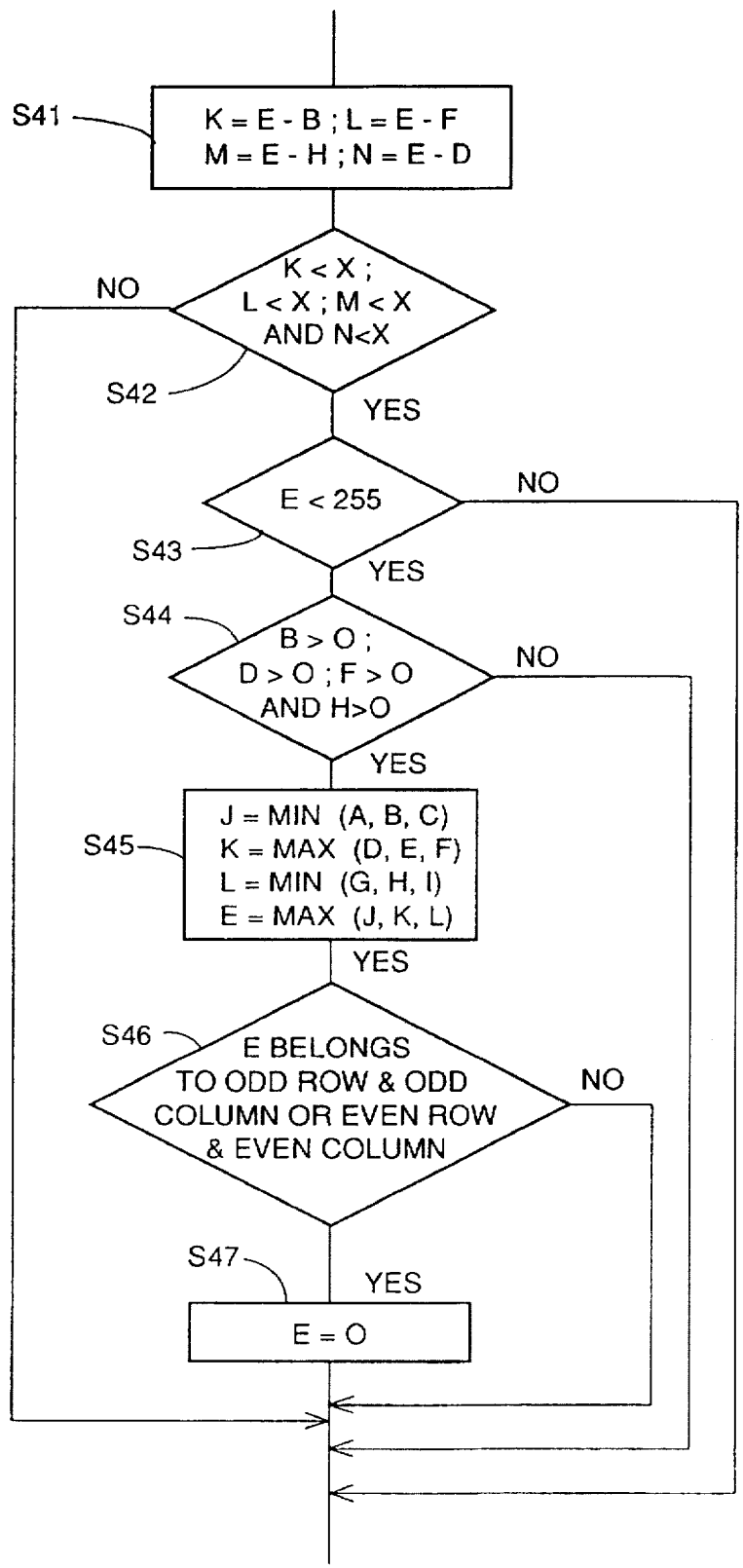
FIG. 17 is a flow chart for illustrating a picture quality improving method according to a further embodiment of the present invention.

FIG. 17 is a flow chart showing a procedure in the DSP according to the fourth embodiment. At a step S41, edge density differences K, L, M and N are obtained similarly to the step S11 in FIG. 10. When at least one of the edge density values K, L, M and N is in excess of a prescribed value X, the density data of the noted dot E is inputted in the pulse generation part 14 of FIG. 8 as such at a step S42, similarly to the step S12 in FIG. 10. If all of the edge density values K, L, M and N are smaller than the prescribed value X, on the other hand, the process advances to a step S43.

If the density data of the noted dot E is at the maximum value of 255 at the step S43, this value is inputted in the pulse generation part 14 of FIG. 8 as such as the density value of the noted dot E. If the density data of the noted dot E is smaller than 255, on the other hand, the process advances to a step S44. If at least one of the density data B, D, F and H of the four dots which are most approximate to the noted dot E is zero at the step S44, the density data of the noted dot E is inputted in the pulse generation part 14 of FIG. 8 as such, similarly to the step S22 in FIG. 12. When all of the values of the four density data B, D, F and H are larger than zero, on the other hand, the process advances to a step S45.

At the step S45, processing for reducing a moire is carried out similarly to the step S31 in FIG. 13, so that staggered masking is performed through steps S46 and S47. When the processing according to the fourth embodiment shown in FIG. 17 is performed in the DSP, a jaggy and a moire are reduced in a printed picture image with neither disappearance nor thickening of thin and white lines of 1-dot widths. In other words, zero is outputted as the density data of the noted dot E with neither disappearance nor thickening of a white line of a 1-dot width also in each of the relatively specific various density patterns shown at (A1)-(B3) in FIG. 16.

Figure 18:
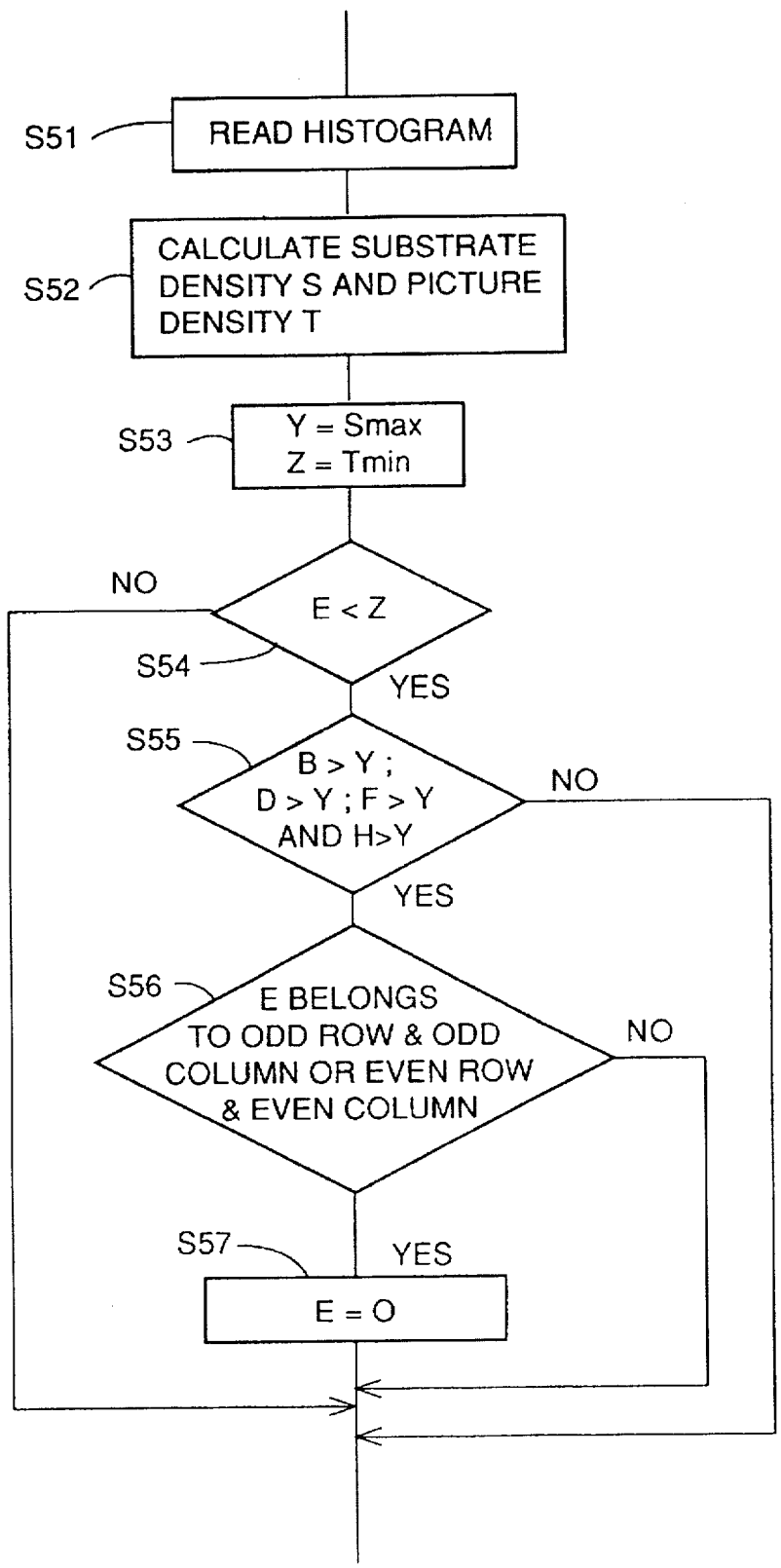
FIG. 18 is a flow chart for illustrating a picture quality improving method according to a further embodiment of the present invention.
Figure 19:
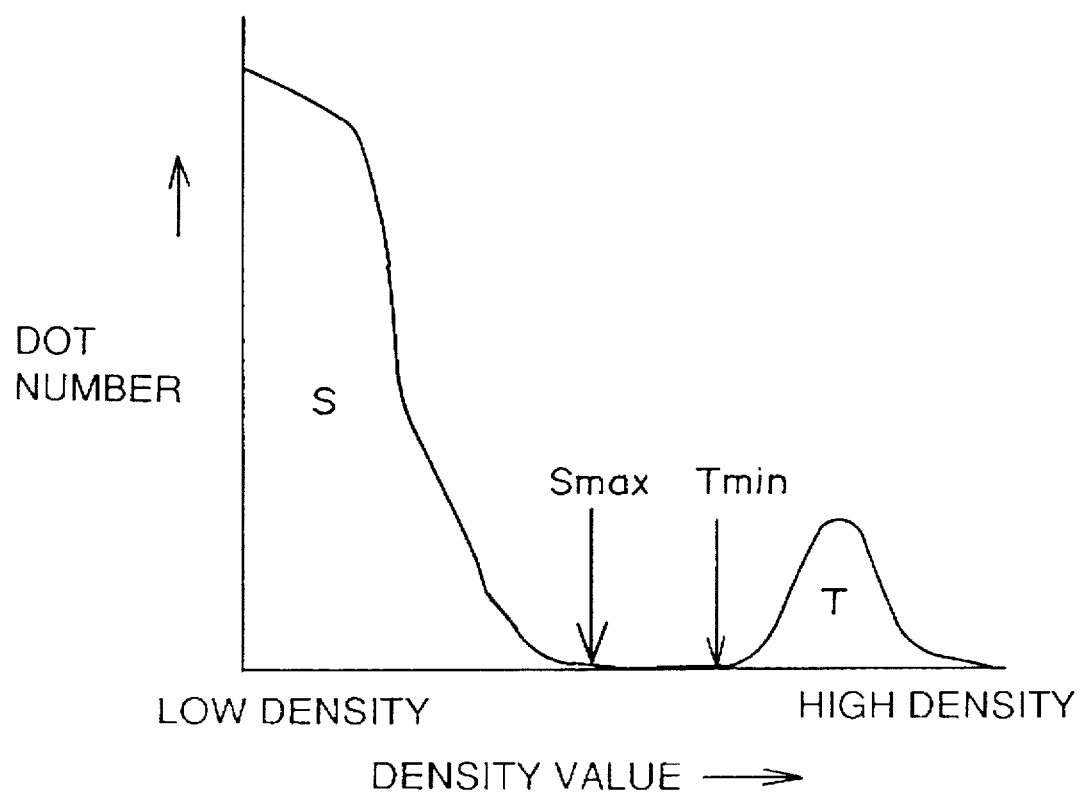
FIG. 19 is a histogram showing a density distribution of dots employed in the embodiment shown in FIG. 18.

FIG. 18 shows a procedure of a picture quality improving method according to a fifth embodiment of the present invention. The fifth embodiment utilizes a histogram expressing a density distribution of a number of dots shown in FIG. 19. Referring to the histogram shown in FIG. 19, the axis of abscissas shows density values, and the axis of ordinates shows dot numbers. According to this embodiment, the masking/picture quality improving part 15 shown in FIG. 8 includes a memory (not shown) for the histogram. When a density distribution of an original including picture images and characters is analyzed with a scanner, two peaks generally appear in the density distribution, as shown in FIG. 19. One peak S shows the density distribution of the substrate, while the other peak T shows that of the picture images and the characters.

At a step S51 shown in FIG. 18, the DSP reads the histogram from the histogram memory. At a step S52, a substrate density S and a picture density T are calculated from the histogram as read.

At a step S53, a value Y is set at the maximum substrate density value Smax, while a value Z is set at the minimum picture density value Tmin.

If the density data of the noted dot E is in excess of the value Z at a step S54, the DSP outputs the density data of the noted dot E as such. If the density data of the noted dot E is smaller than the value Z, on the other hand, the process advances to a step S55.

If at least one of the density data of the four most approximate dots B, D, F and H is not more than the value Y, the DSP outputs the density data of the noted dot E as such. If all of the density data of the four most approximate dots B, D, F and H are larger than the value Y, on the other hand, the process advances to steps S56 and S57, so that the aforementioned staggered masking is performed.

In the picture quality improving method shown in FIG. 18, it is possible to reduce a jaggy also with respect to picture images and characters in an original which is provided on a substrate having a certain density value.

Figure 20:
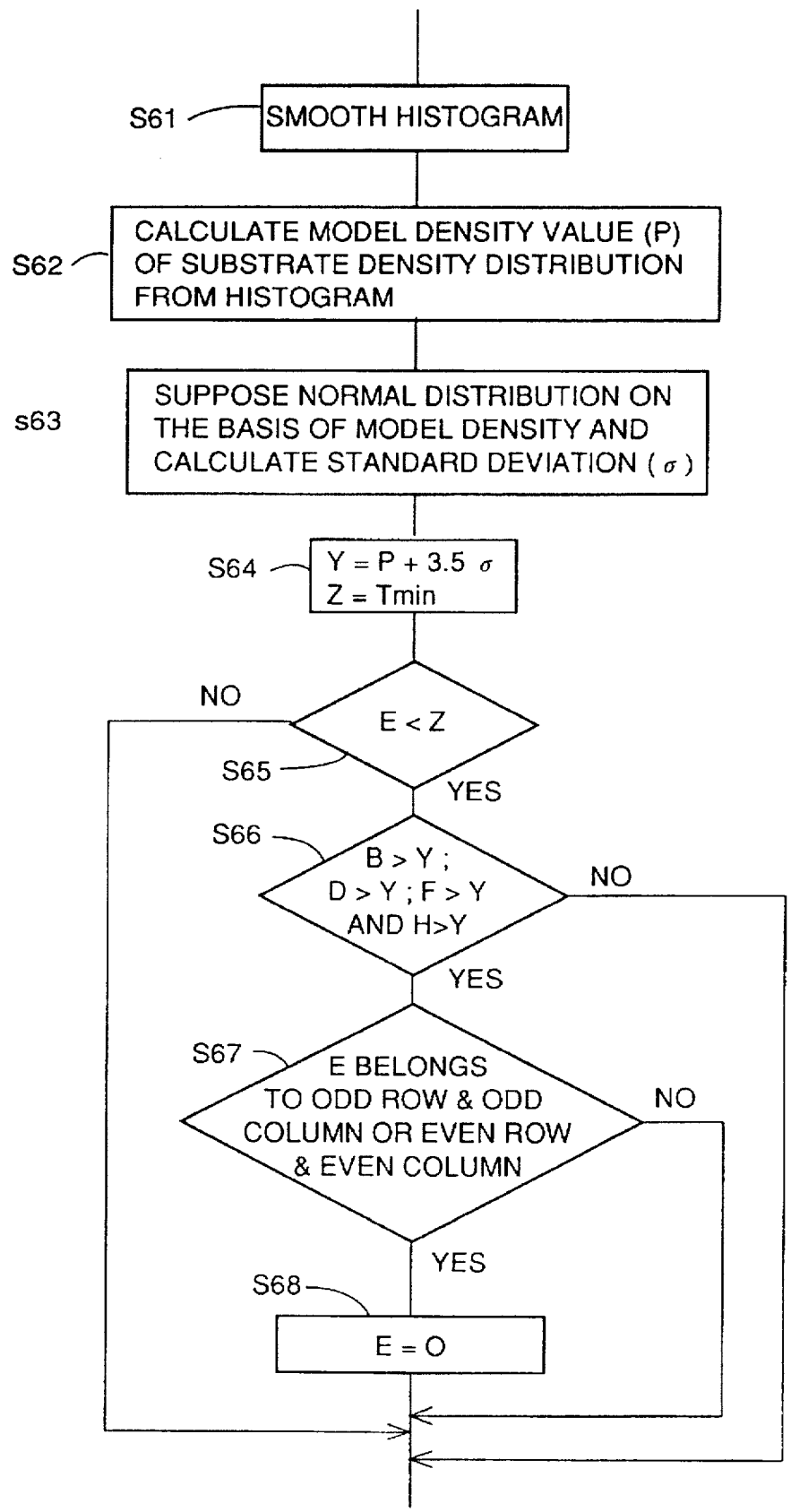
FIG. 20 is a flow chart for illustrating a picture quality improving method according to a further embodiment of the present invention.
Figure 21:
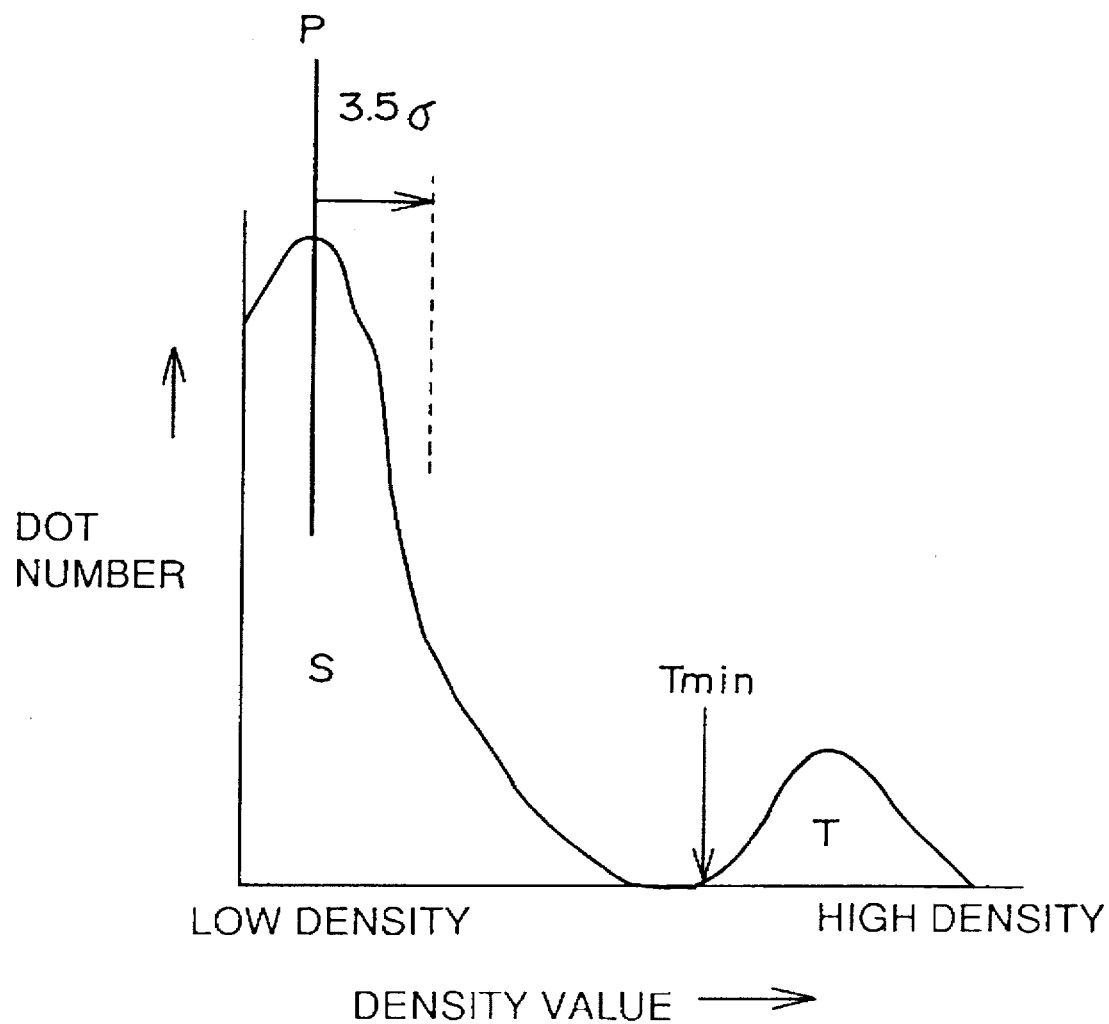
FIG. 21 is a histogram showing a density distribution of dots employed in the embodiment shown in FIG. 20.

FIG. 20 shows a flow chart for illustrating a sixth embodiment of the present invention. The embodiment shown in FIG. 20, which is similar to that shown in FIG. 18, utilizes a histogram shown in FIG. 21. In the histogram shown in FIG. 21, which is similar to that shown in FIG. 19, a peak S of a density distribution has a model density value P.

At a step S61 shown in FIG. 20, the DSP reads the histogram from the histogram memory for smoothing the same. At a step S62, the model density value P of the substrate density distribution S is calculated from the smoothed histogram.

At a step S63, a normal distribution is supposed on the basis of the model density P, and a standard deviation σ thereof is calculated.

At a step S64, (P+3.5σ) is set as a value Y, while the minimum value Tmin of the picture density T is set as a value Z.

Then, jaggy reduction and staggered masking are performed through steps S65 to S68, similarly to the steps S54 to S57 in FIG. 18.

Figure 22:
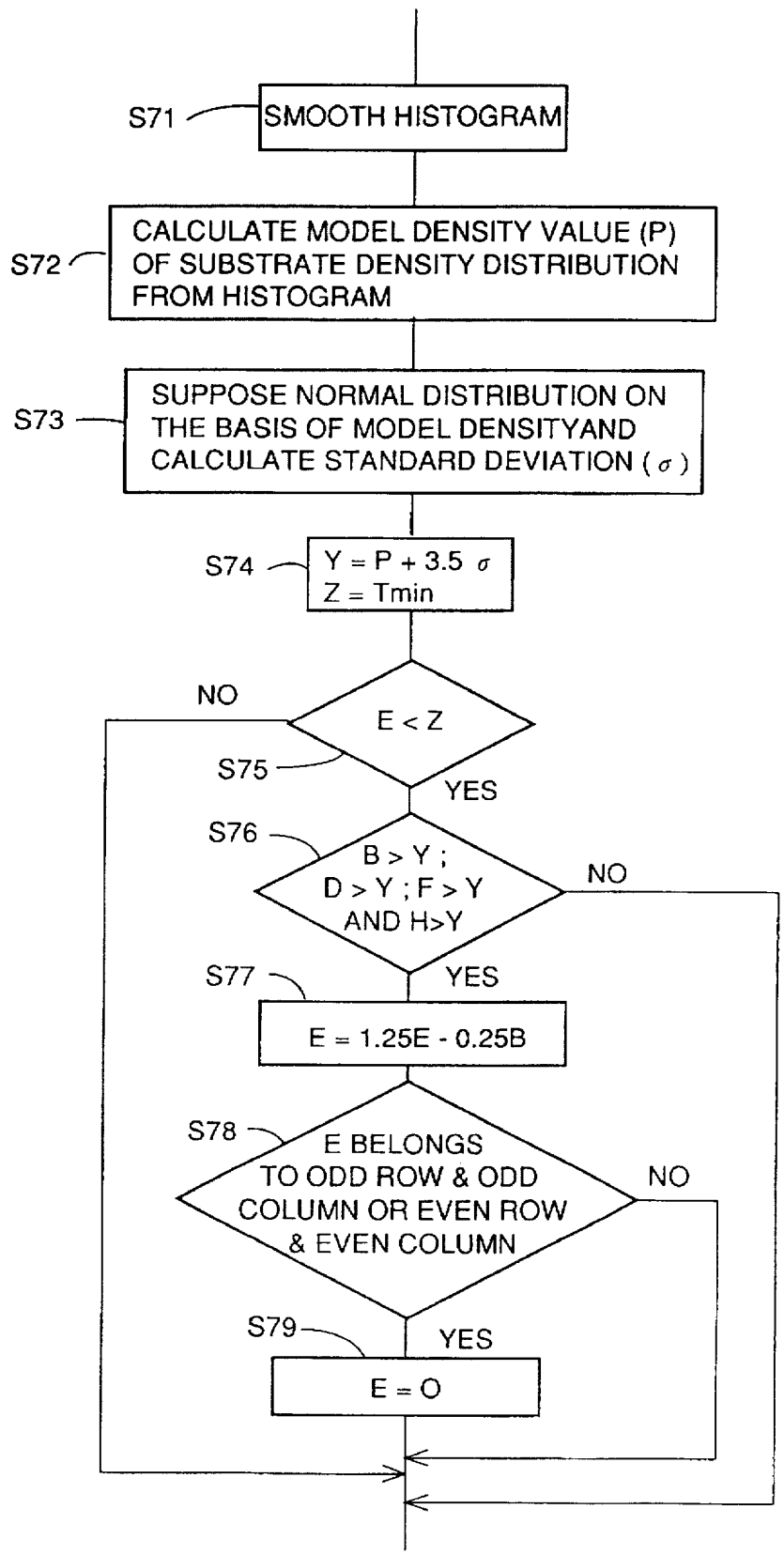
FIG. 22 is a flow chart for illustrating a picture quality improving method according to a further embodiment of the present invention.

FIG. 22 shows a flow chart of a picture quality improving method according to a seventh embodiment of the present invention. In general, a thermal head comprises a heat storage correcting part, which includes a line memory and a DSP. The heat storage correcting part is adapted to prevent plotted dots from increase in density caused by heat storage when the same heating elements of the thermal head are continuously energized while preventing dots from being plotted by remaining heat when energization is stopped after continuous energization. Namely, the storage heat correction part corrects the energization time for the heating elements for dots to be currently printed, in consideration of the energization time for the same heating elements in a precedent line.

The embodiment shown in FIG. 22 makes the masking/picture quality improving part 15 shown in FIG. 18 perform storage heat correction, thereby enabling omission of a storage heat correcting part which is independently provided in general.

Steps S71 to S76 shown in FIG. 22 are similar to the steps S61 to S66 shown in FIG. 20. At a step S77, however, a value obtained by subtracting that of 0.25 times the density data of a dot B, which is plotted by the same heating elements in a precedent line, from a value of 1.25 times the density data of the noted dot E is set as new density data of the noted dot E. Thereafter the aforementioned staggered masking is performed at steps S78 and S79.

A sublimation/fusion transfer switch 20 shown in FIG. 8 is provided in this embodiment of the present invention. The transfer switch 20 detects the structure of an ink ribbon cartridge, to determine whether the ink ribbon is of a fusion or sublimation type. In response to the type of the ink ribbon as detected, the switch 20 informs the masking/picture quality improving part 15 whether the fusion printing or the sublimation printing is to be selected. When the sublimation printing is selected, it is not necessary to take overlapping of adjacent dots into consideration since the areas of the dots as plotted are not dependent on densities thereof, and hence the aforementioned staggered masking is stopped so that all dots are plotted. When the fusion printing is selected, on the other hand, the picture quality improving method described with reference to any of the aforementioned embodiments is carried out. Namely, it is possible to improve the picture quality by the aforementioned picture quality improving method when the fusion thermal printing is performed while it is possible to obtain picture quality of high resolution since staggered masking is stopped when the sublimation thermal printing is selected, by providing the sublimation/fusion transfer switch 20 in the fusion/sublimation associative printer, as shown in FIG. 18.

A gradation control method according to the present invention is now described. In the inventive gradation control method, a mask pattern consisting of a dot matrix with two rows and two columns is employed for selecting positions of dots to be printed through the mask by controlling a current which is fed to heating elements provided in a thermal head in practice. Thus, it is possible to control gradations by selecting the number of dots to be printed by the mask.

Figure 23:
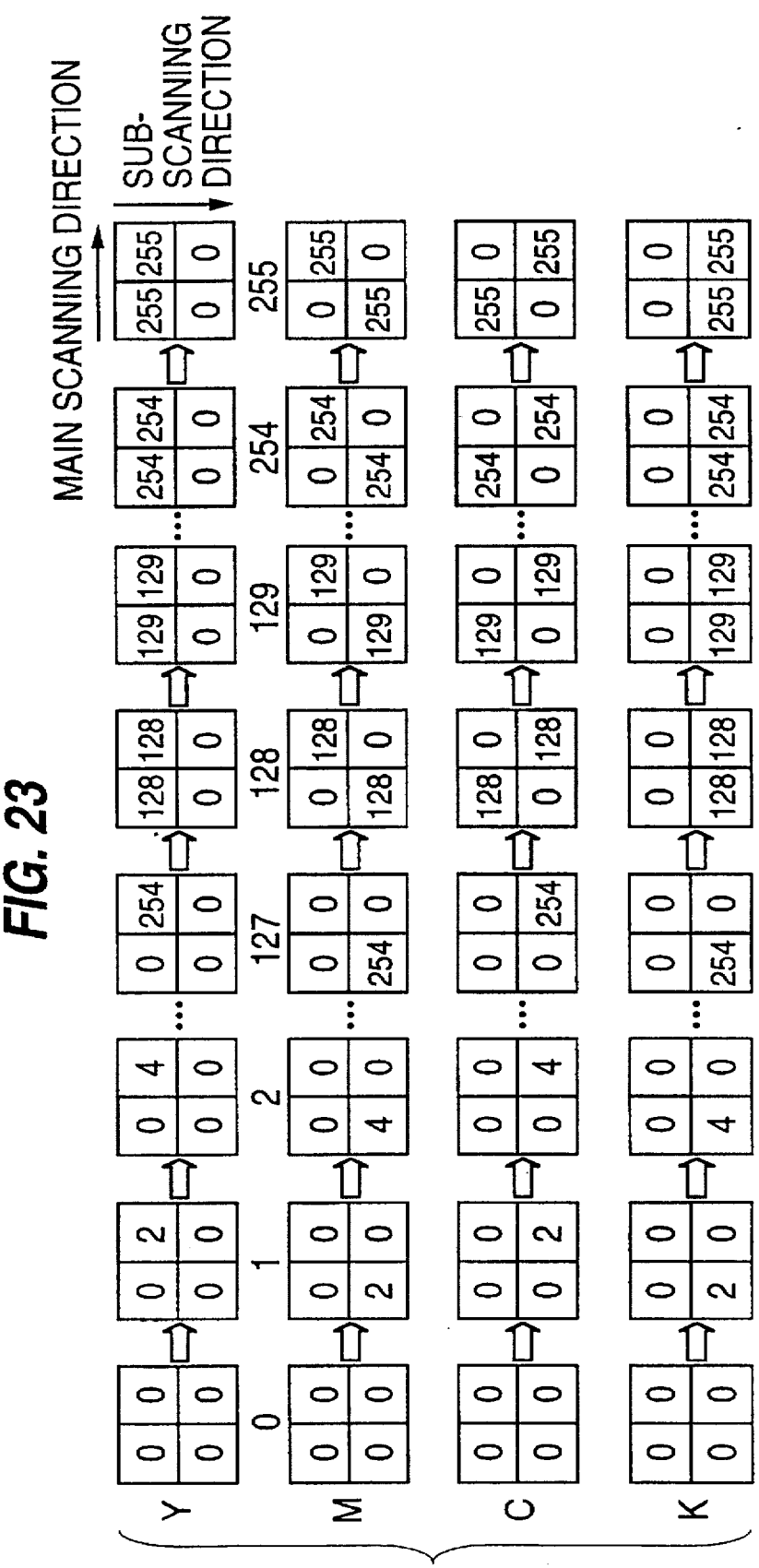
FIG. 23 shows dot mask patterns for illustrating an exemplary gradation control method according to the present invention.

FIG. 23 illustrates exemplary gradation control according to the present invention. The uppermost row shows a mask pattern in yellow Y, while second, third and fourth rows show mask patterns in magenta M, cyan C and black K respectively. In each of pixels shown in the leftmost column, no ink is transferred to any of four dots, showing the lowest gradations. The gradations of the pixels are increased with rightward progress of the columns to which the pixels belong. Numerals provided in sections of the respective dots show times for energizing heating elements in a unit of a certain time. Referring to FIG. 23 showing pixels each including a dot matrix with two rows and two columns, the rightward direction corresponds to a main scanning direction along the heating elements, while the downward direction corresponds to a subscanning direction along the direction for feeding a paper.

In the gradation control shown in FIG. 23, the ink is transferred to only upper right dots up to a gradation value of 127 in the pixel row of yellow Y, for example. In gradation values exceeding 128, however, the ink is transferred onto both of upper dots. At this time, the gradation change rate is abruptly changed if the change rate of the energization time for the heating elements remains unchanged with respect to change of picture data, due to change of the number of the dots to which the ink is transferred.

In order to prevent such inconvenience, the ink is transferred only to single dots in the range of the gradients of 0 and 127, while the energization time for the heating elements is increased by 2 every time the picture data is increased by 1. Namely, the energization time for the heating elements is twice the picture data, and this energization time is changed from 0 to 254 while the gradients are changed from 0 to 127. While the gradients are changed from 128 to 255, on the other hand, two dots are plotted so that an energization time per dot is increased by 1 every time the picture data is increased by 1. Namely, the energization time per dot is changed from 128 to 255 while the gradients are changed from 128 to 255.

Figure 24:
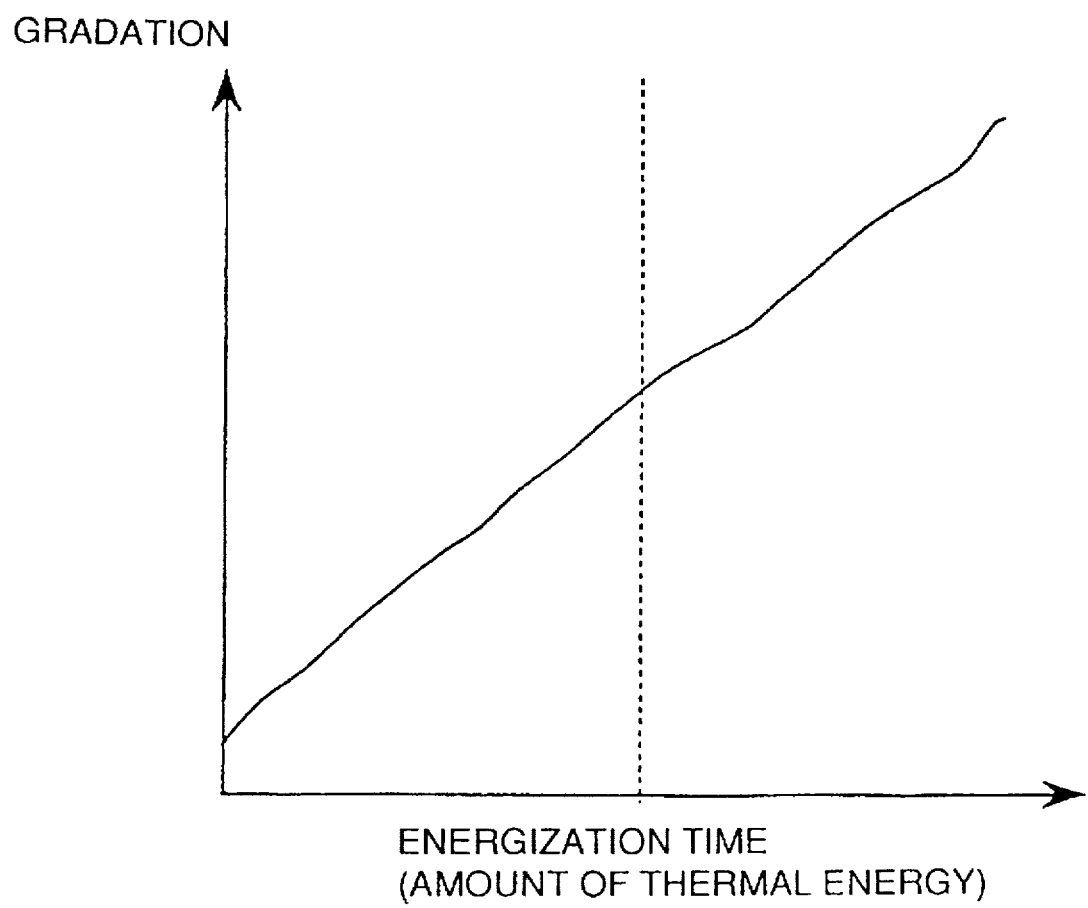
FIG. 24 is a graph showing preferable relation between a heating element energization time and gradations in actual printing.

FIG. 24 shows relation between an energization time and gradations in actual printing by the gradation control method shown in FIG. 23. Referring to FIG. 24, the vertical broken line shows a boundary as to whether only one dot or two dots are plotted in one pixel. It is important to select the energization time for the heating elements so that the change rate of gradations is not extremely changed about this boundary.

While the above description of the gradation control method is made with reference to yellow Y, magenta M, cyan C and black K are also gradation-controlled similarly to yellow Y. When only one dot is plotted in one pixel, however, magenta, cyan and black are plotted on left lower, right lower and left lower dots of the dot matrix respectively. When two dots are plotted in one pixel, on the other hand, right upper and left lower, left upper and right lower, and left lower and right lower dots are plotted as to respective ones of magenta, cyan and black. Thus, at least magenta and cyan inks will not overlap with each other.

When yellow, magenta and cyan inks overlap with each other, inconvenience is easily caused particularly when magenta and cyan overlap with each other. When the inks are transferred in order of yellow, magenta and cyan, the volumes of the inks directly transferred onto a paper are different from those required when a cyan ink overlaps on a magenta ink which is transferred onto a paper, even if energization times for the heating elements for transferring the cyan inks are identical to each other. In order to prevent this, it is desirable to avoid overlapping of magenta and cyan inks.

Figures 25A, 25B:
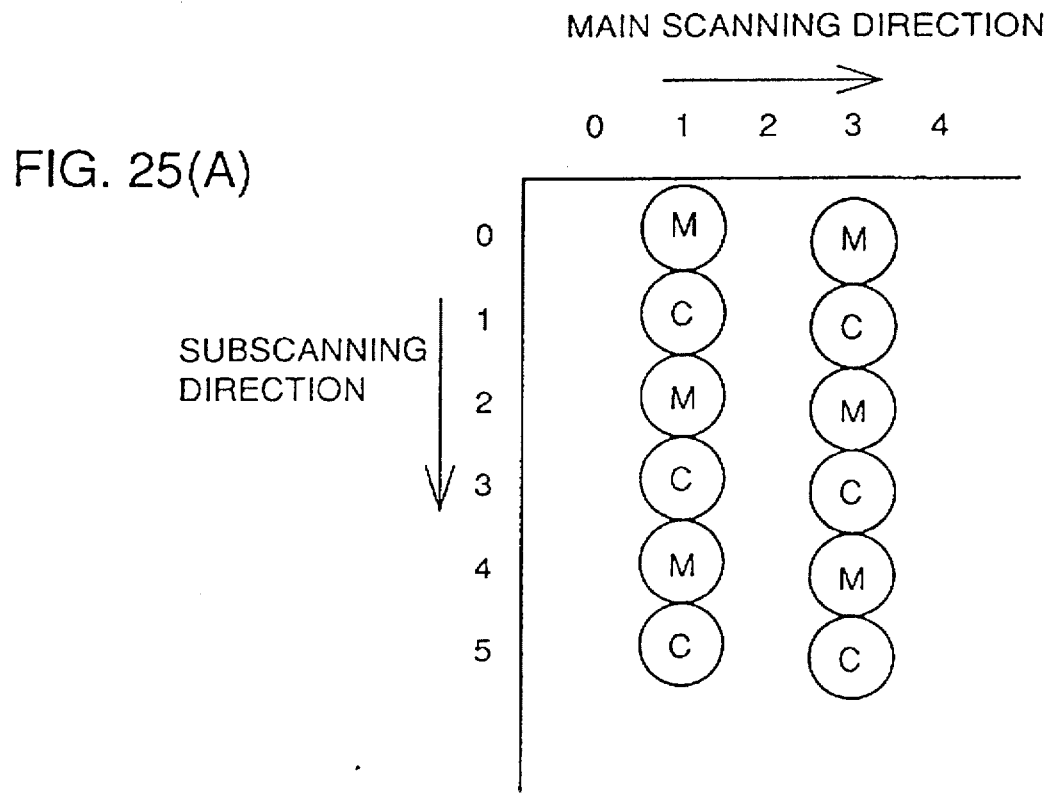
FIGS. 25A and 25(B) illustrate a plot pattern for reducing overlapping of magenta and cyan inks when each of magenta and cyan is plotted only in one dot in each pixel.

FIGS. 25(A) and 25(B) illustrate an exemplary method of avoiding overlapping of magenta and cyan inks in a case of plotting only one of four dots included in each pixel. Referring to FIG. 25(A), only odd dots are printed in each line along a main scanning direction, so that only magenta is printed in even lines and only cyan is printed in odd lines. It is possible to carry out such printing by deciding whether addresses in the main scanning direction and a subscanning direction are odd or even bits, as shown in FIG. 25(B). Namely, cyan may be plotted when both of addresses along the main scanning and subscanning directions are odd bits, while magenta may be plotted when addresses in the main scanning direction are odd and those in the subscanning direction are even. It is possible to simply produce a signal for deciding whether or not dots are masked by utilizing only addresses of least significant bits of the main scanning and subscanning sides.

Figures 26A, 26B:
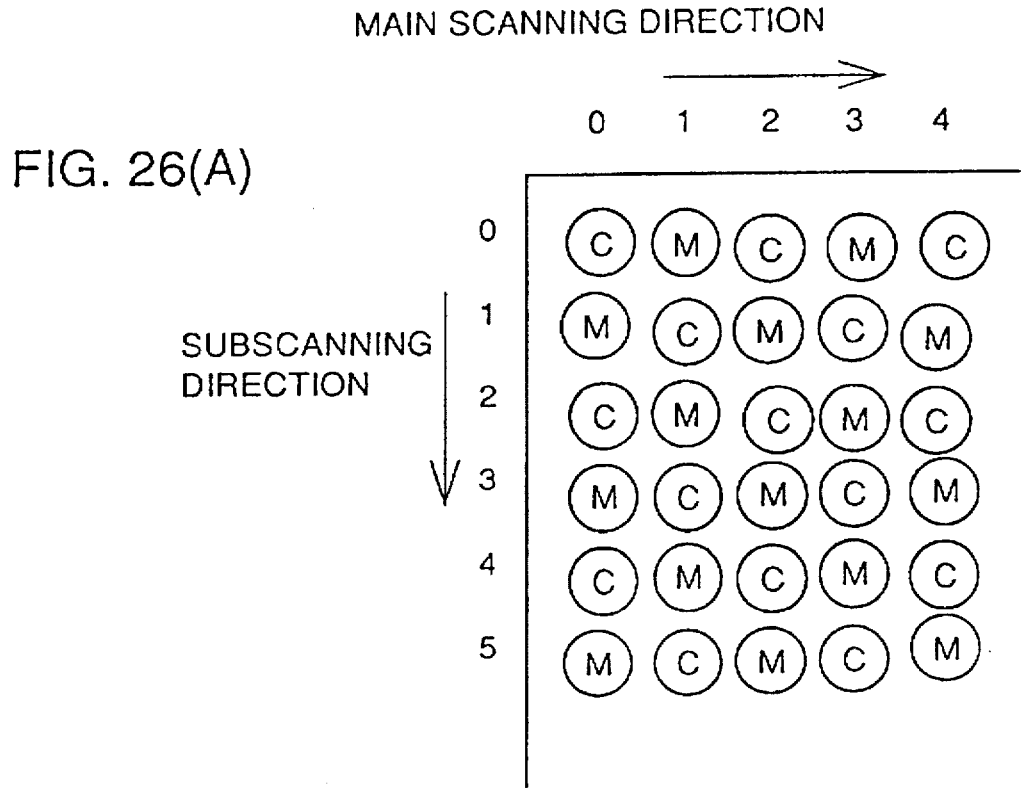
FIGS. 26(A) and 26(B) illustrate a plot pattern for reducing overlapping of magenta and cyan inks when two dots are plotted as to each of magenta and cyan in each pixel.

FIGS. 26(A) and 26(B) illustrate another exemplary method of avoiding overlapping of magenta and cyan inks. Referring to FIG. 26(A), magenta is printed on two of four dots included in each pixel, while cyan is printed on the remaining two dots. Namely, magenta is printed on even dots along the main scanning direction in odd lines, and on odd dots in even lines. On the other hand, cyan is printed on odd dots in the odd lines, and on even dots in the even lines.

Also in this case, it is possible to decide the mask pattern by the least significant address bits, as shown in FIG. 26(B). Cyan may be plotted only when both of main scanning direction and subscanning direction addresses are odd and even, and can be controlled by EXOR (exclusive OR) of the addresses. On the other hand, magenta may be plotted only when main scanning direction addresses are odd and subscanning direction addresses are even or vice versa, and can be controlled by EXNOR (exclusive NOR) of the main scanning direction and subscanning direction addresses.

Description is now made on a method of displacing dot positions for plotting cyan and magenta along a main scanning direction in a mask pattern for plotting only one dot as to each ink in each pixel. Before describing this method, explanation is made as to why this method is preferable with reference to a staggered pattern.

Figure 27A:
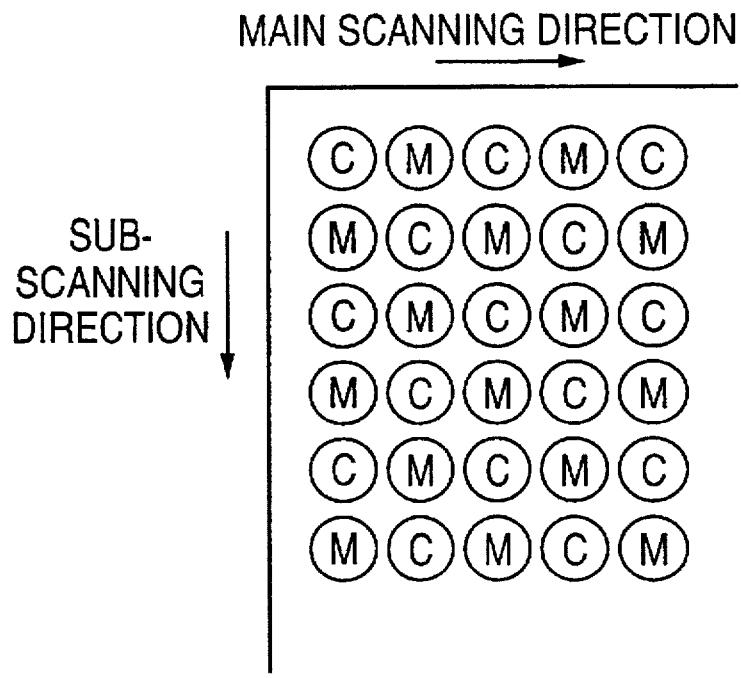
FIGS. 27(A) and 27(B) illustrate a plot pattern showing overlapping of magenta and cyan inks which is caused when a paper is irregularly fed.

FIG. 27(A) shows plot arrangement for preventing overlapping of cyan and magenta inks through a staggered mask pattern. It is possible to reduce overlapping of the cyan and magenta inks by employing such plot arrangement. However, positional relation between cyan and magenta may be displaced when the paper is moved with the ink ribbon for plotting cyan after magenta is plotted. Such displacement is easily caused particularly in position control in a subscanning direction, which is the direction of progress for the paper and the ink ribbon. In a printer having resolution of 300 DPI (dots per inch), the interval between dots is extremely reduced to about 80 µm since 12 dots are printed per millimeter. When paper feeding is slightly displaced by several 10 µm, therefore, cyan and magenta inks overlap with each other as shown in FIG. 27(B).

Figure 27B:
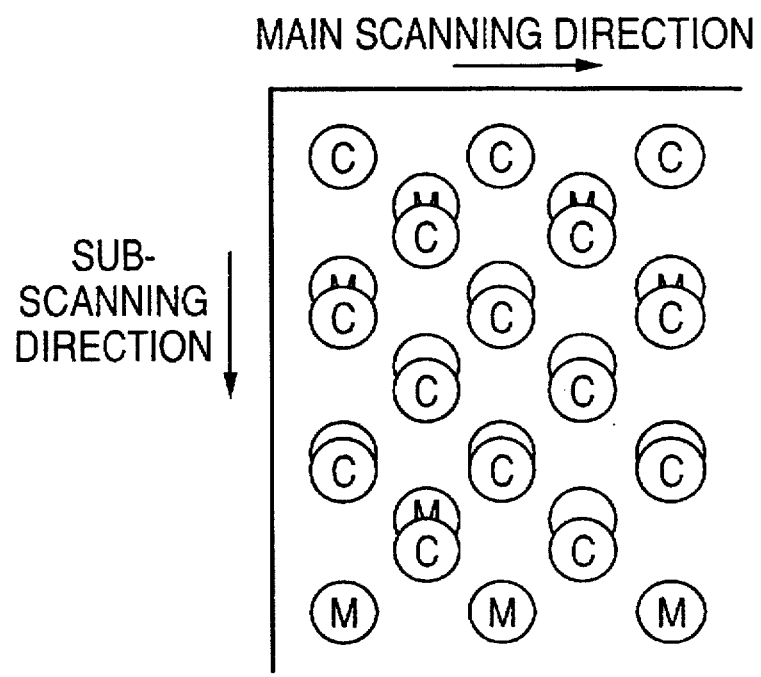

Although the prints shown in FIGS. 27(A) and 27(B) are based on the same picture data, color overlapping is changed due to only small irregularity in paper feeding. In this case, the cyan ink hardly adheres onto the magenta ink, while the color as printed is changed to cause imperfect color reproducibility due to ink permeability when the cyan ink overlaps on the magenta ink, although the picture data and the energization time for the heating elements remain unchanged. Further, color irregularity may be caused in different positions of one printed image due to the irregularity in paper feeding.

Figure 28A:
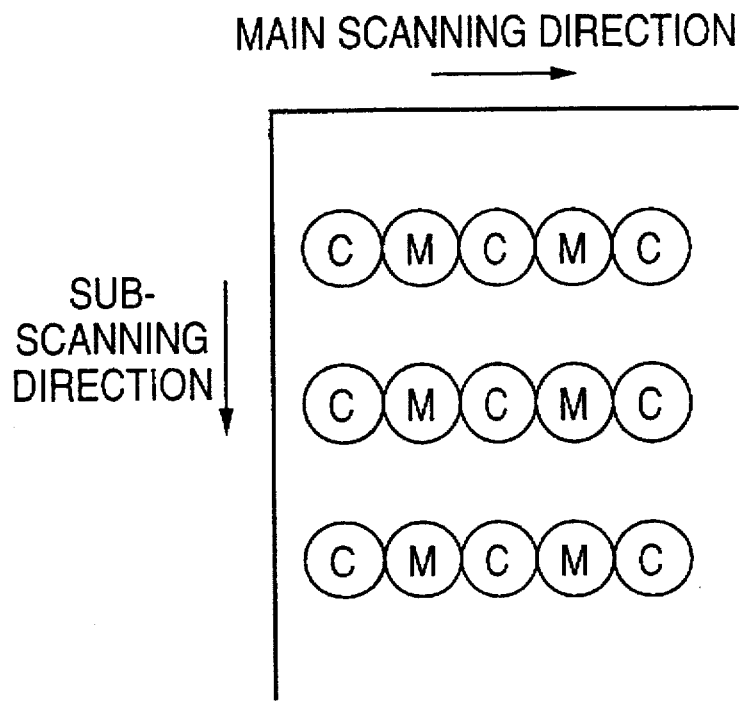
FIGS. 28(A) and 28(B) illustrate a plot pattern which can reduce overlapping of magenta and cyan inks even if a paper is irregularly fed when only one dot is plotted as to each of magenta and cyan in each pixel.
Figure 28B:
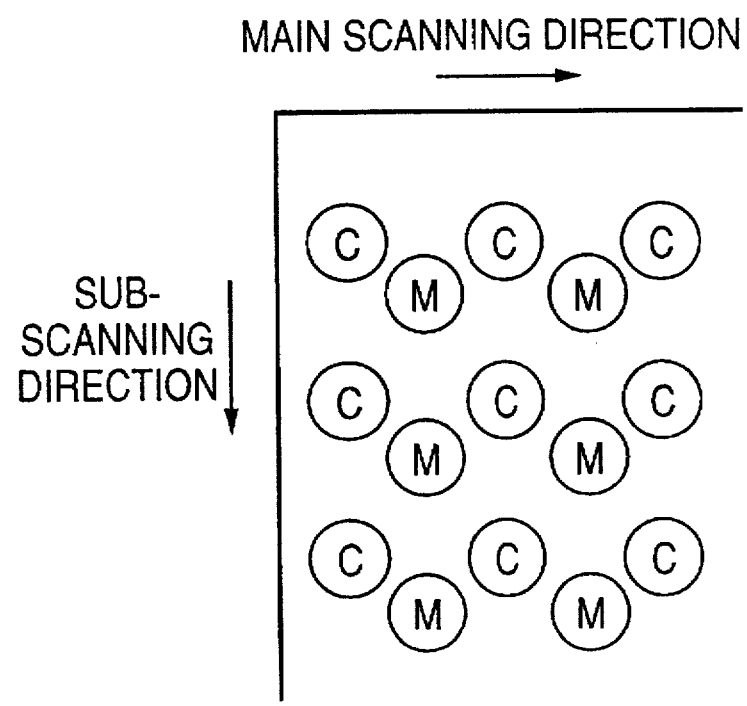

FIGS. 28(A) and 28(B) illustrate a method which can attain excellent color reproducibility while preventing occurrence of color irregularity depending on positions of one picture image regardless of slight irregularity in paper feeding. This method is effective when only one dot is plotted in each pixel as to each color ink. As shown in FIG. 28(A), cyan may be plotted on odd dots and magenta may be plotted on even dots in each line. It is possible to prevent reduction in color reproducibility caused by irregular paper feeding by employing this mask pattern.

Even if slight irregularity is caused in paper feeding as shown in FIG. 28(B), cyan and magenta will not overlap with each other since columns including cyan plotting and magenta plotting are different from each other, as shown in FIG. 28(B).

Figure 29:
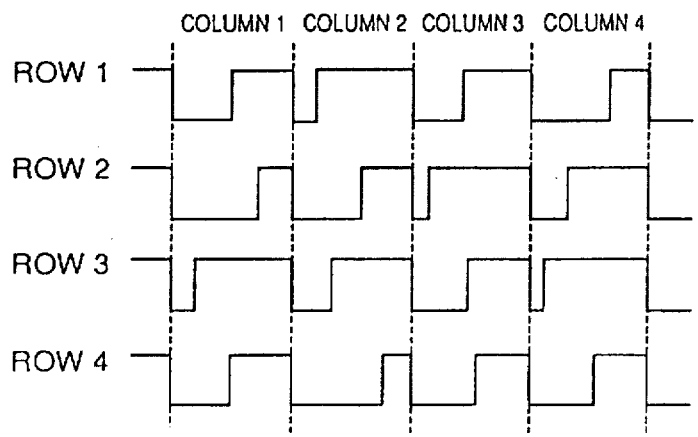
FIGS. 29(A1)–29(C2) illustrate methods which can make gradation control while maintaining excellent gray balances.
Figure 29:
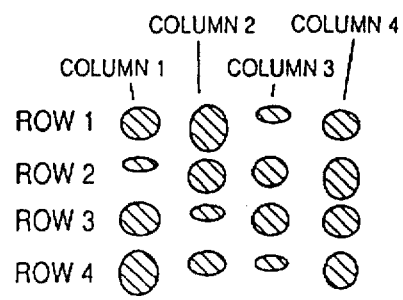
Figure 29:
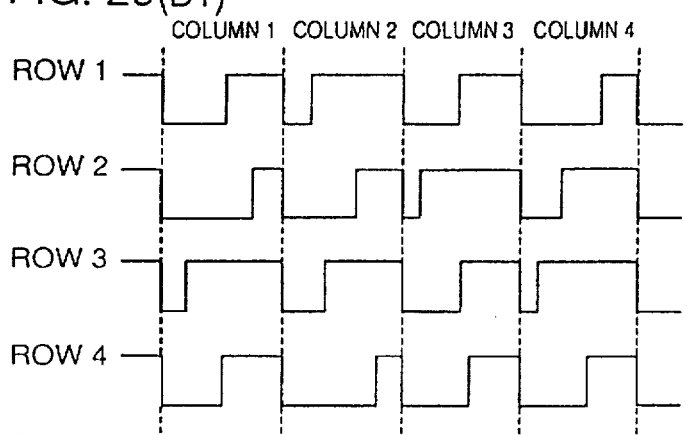
Figure 29:
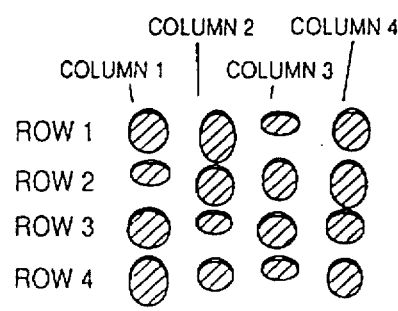
Figure 29:
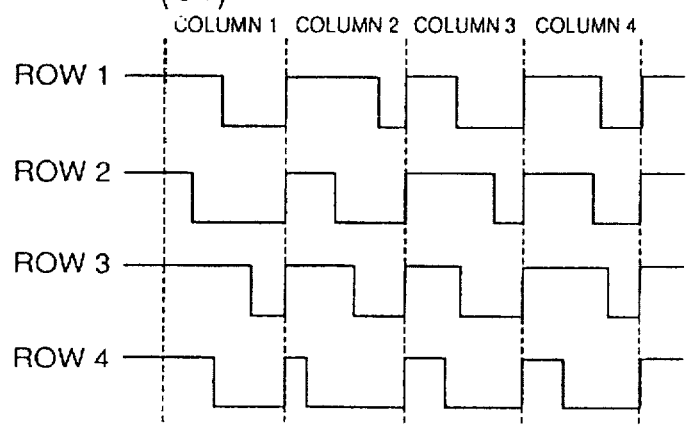
Figure 29:
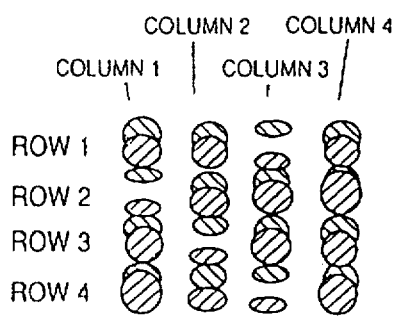

FIGS. 29(A1)–29(C2) illustrate another method which can reduce overlapping of magenta and cyan. This method is particularly effective when gray is printed by thermally transferring yellow, magenta and cyan inks in a fusion manner without employing a black ink. It is possible to print a monochromatic picture image of gray with no irregularity in gradation by employing a black ink. When gray is printed by color fusion thermal transfer employing no black ink, on the other hand, it is necessary to express gray by mixing yellow, magenta and cyan with each other. As repeatedly described above, a problem of inferior adhesion of the cyan ink arises when the cyan ink is transferred on a magenta ink which is transferred onto a paper. If a gray balance is deteriorated by this problem, the picture quality is conspicuously reduced as compared with another color.

Volumes of the yellow, magenta and cyan inks which are required for displaying gray are substantially equal to each other, and hence energization times for heating elements related to the respective colors are also substantially equal to each other. As understood from FIG. 5, a current is fed to the thermal head 1 having a number of heating elements over the length of one line for transferring the inks provided on the ink ribbon 4 onto the paper 3. After a number of dots on one line are simultaneously printed, the ink ribbon 4 and the paper 3 are advanced in the direction perpendicular to the line provided with the heating elements. After yellow is transferred to the overall screen, the paper 3 is returned to its original position, so that magenta is then transferred to the overall screen. Thereafter the paper 3 is again returned to the original position, so that cyan is transferred onto the overall screen. Since three color inks are employed, printing of one screen is completed by reciprocating the paper 3 three times.

FIGS. 29(A1)–29(C2) illustrate this printing style as to plotting of four rows and four coles of magenta and cyan inks, which must not overlap with each other in particular, for simplification of the illustration. First, picture data corresponding to a magenta column 1 (first line) is transferred to the thermal head, so that a current is fed to the heating elements in correspondence to the data in FIG. 29(A1). The current is fed in negative logic by a time which is proportionate to the width of a negative pulse. Also as to second, third and fourth lines, the heating elements are energized in correspondence to negative pulses of columns 2, 3 and 4 respectively. Thus, a magenta plot pattern shown in FIG. 29(A2) is obtained.

Also as to cyan, a current is fed to each heating element in correspondence to picture data. Volumes of magenta and cyan inks are substantially identical to each other in case of monochromatic data, and hence a plot pattern in which cyan and magenta substantially overlap with each other is attained as shown in FIG. 29(B2) when the energization time as to cyan is set on the basis of the energization start time similarly to the set reference for the energization time as to magenta, as shown in FIG. 29(B1). In order to reduce such overlapping of the cyan and magenta inks, it is desirable that the energization time as to cyan is set on the basis of the energization end time, as shown in FIG. 29(C1). Namely, it is possible to attain a plot pattern having small overlapping of the magenta and cyan inks as shown in FIG. 29(C2), by employing the setting of the energization times as to magenta and cyan as shown in FIG. 29(A1) and FIG. 29(C1).

The aforementioned gradation control method, which is applicable to a color fusion type thermal transfer printer as a matter of course, can attain an excellent effect particularly in a sublimation/fusion associative thermal transfer printer. When the inventive gradation control method is applied to a sublimation/fusion associative thermal transfer printer, it is possible to change ON and OFF states of the transfer switch by changing the shapes of ink ribbon cassettes, in order to detect whether sublimation inks or fusion inks are employed. It is possible to automatically carry out the inventive gradation control method when fusion inks are employed in response to the switch.

Figure 30:
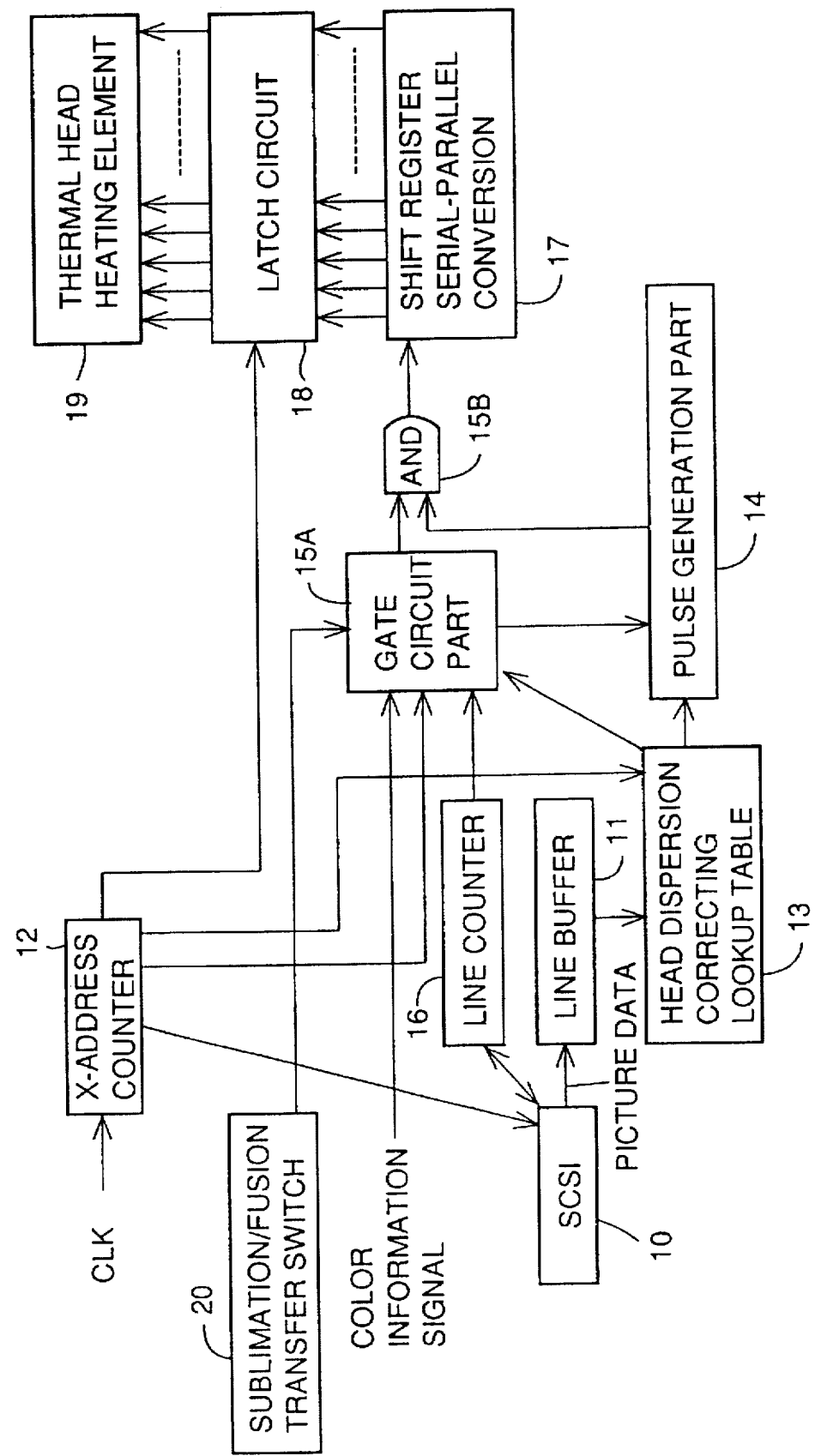
FIG. 30 is a block diagram showing a control system which is employed in a thermal transfer printer for implementing the present invention.

FIG. 30 is a schematic block diagram showing a control system for executing the aforementioned gradation control method. In this system, a host computer transfers picture data to a printer by an SCSI (small computer system interface) 10. The picture data are transferred in order of yellow, magenta and cyan, so that data of a next color are transferred after data of an overall screen are transferred as to each color. The picture data are formed by eight bits as to each color. A line buffer 11 provided in the printer stores picture data for one line.

An X address counter 12 is provided for forming addresses of the picture data along a main scanning direction (direction of arrangement of heating elements) in synchronization with the transfer of the picture data. An output of the X address counter 12 is inputted in an address of a head dispersion correcting lookup table 13. The head dispersion correcting lookup table 13 also receives picture data from the line buffer 11, to correct dispersion as to resistance values of the heating elements of a thermal head 19 etc. The corrected picture data are inputted in a pulse generation part 14, which is adapted to generate timing for turning on the heating elements of the thermal head 19 in response to the values of the picture data.

While the picture data are masked in response to dot positions in the present invention, a mask signal is outputted from a gate circuit 15A and inputted in the pulse generation part 14. Namely, the gate circuit 15A receives addresses of a direction X from the X address counter 12 and linewise addresses from a line counter. A mask pattern is formed by a dot matrix with two rows and two columns, and hence only least significant bits may sufficiently be employed as to both of X addresses and line addresses for expressing the same. A mask pattern signal and a picture data shift signal are formed by these two bits and a color information signal, so that these signals are inputted in the pulse generation part 14 from the gate circuit 15A. The color information signal expresses whether the color of currently processed picture data is yellow, magenta or cyan.

Shifting of the picture data is required for changing the energization time for the heating elements depending on whether two dots are plotted (two dots are masked) or one dot is plotted (three dots are masked). A determination as to whether one dot or two dots are plotted is made depending on whether the most significant bit of the picture data is "1" (i.e., at least 80 H in hexadecimal) or "0" (i.e., not more than 7 H in hexadecimal). In other words, two dots are plotted if the most significant bit is "1", while one dot is plotted when the most significant bit is "0".

The picture data is upwardly shifted by only one bit when only one dot is plotted. If the picture data are 13 H, for example, a pulse duration corresponding to 26 H is generated only in one of four dots. When the picture data are 88 H, on the other hand, a pulse duration of an energization signal for the thermal head 19 corresponding to 88 H is generated as to two of the four dots. It is possible to readily decide for which dot a pulse signal serving as the energization signal is generated by a logical operation of a two-bit input of the least significant bit of the addresses.

The mask signal outputted from the gate circuit 15A and the output of the pulse generation part 14 are connected to an input of an AND gate 15B, so that the mask signal is zeroed when masking is performed. This is an example of positive logic. The masked pulse signal is inputted in a shift register 17. The pulse signal for one line is serial-parallel converted after the same is inputted in the shift register 17, so that energization signals are inputted in a latch circuit 18 by the number of the heating elements of the thermal head 19. The latch circuit 18 is latched by a latch signal which is outputted from the X address counter 12, so that the energization pulse signals corresponding to respective dots energize the heating elements provided in the thermal head 19 in response to the picture data. The temperatures of the heating elements of the thermal head 19 are increased in response to the energization times, so that inks provided on a fusion ink ribbon are fused and transferred onto a paper.

As hereinabove described, it is possible to readily implement the inventive gradation control method by adding the gate circuit part 15A etc. into a conventional control system for a thermal transfer printer.

The embodiment shown in FIGS. 24(A1)–29(C2) can be implemented by inputting color information in the pulse generation part 14 and selecting whether the energization times for the heating elements are set on the basis of energization start or end times.

When a sublimation/fusion associative thermal transfer printer is employed in a sublimation mode, it is possible to perform sublimation thermal transfer by converting a signal from the sublimation/fusion transfer switch 20 to "1" when a sublimation ink ribbon is employed and setting an output signal from the gate circuit 15A at "1" regardless of other signals in this case.

According to the present invention, as hereinabove described, it is possible to reduce a jaggy in a contour part of a picture image or in a line picture as well as to reduce a moire in a halftone-dot picture image when gradation control is carried out in a fusion type thermal printer by staggered masking.

According to the present invention, further, it is possible to perform multistage gradation control without remarkably sacrificing resolution of a picture image in a color fusion thermal transfer printer, while also improving color reproducibility of a color picture image.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for improving picture quality in a thermal printer by controlling a density value of one dot by feeding timed current to a heating element of a thermal head of the thermal printer which adapts a staggered printing system wherein odd dots in a row and even dots in the next row are to be masked, the method comprising the steps of:

(a) checking a first condition of whether a density data of said one dot is higher than a high reference density value;

(b) checking a second condition of whether a density data of at least one of four dots nearest neighboring to said one dot is not higher than a low reference density value; and (c) if at least one of the first and second condition is satisfied, plotting said one dot, even if said one dot corresponds to a dot to be masked in said staggered printing system.

2. The method as in claim 1, further comprising the steps of:

(d) obtaining edge differences between said one dot and the neighboring dots;

(e) checking a third condition of whether at least one of said edge differences is larger than a further reference value; and (f) if the third condition is satisfied, plotting said one dot, even if neither of the first and second conditions are satisfied.

3. The method as in claim 2, further comprising the steps of:

(g) providing a dot matrix of nine dots arranged in three rows and three columns, wherein said one dot is in the center of the matrix;

(h) determining a maximum density value of a middle row of the matrix;

(i) determining a minimum density value of each of upper and lower rows in said matrix; and (j) comparing the values determined in steps (h) and and selecting the greatest of said values and plotting said greatest value as the density value of said one dot if said one dot is not to be masked in said staggered printing system.

4. The method as in claim 1 further comprising the steps of:

(d) providing a dot matrix of nine dots arranged in three rows and three columns, wherein said one dot is in the center of the matrix;

(e) determining a maximum density value of a middle row of the matrix;

(f) determining a minimum density value of each of upper and lower rows in said matrix; and (g) comparing the values determined in steps (e) and (f) and selecting the greatest of said values and plotting said greatest value as the density value of said one dot if said one dot is not to be masked in said staggered printing system.

5. A method for improving picture quality to reduce moiré effect in a thermal printer by controlling a density value of one dot by feeding timed current to a heating element of a thermal head of the thermal printer which adopts a staggered printing system wherein odd dots in a row and even dots in the next row are to be masked, the method comprising the steps of:

(a) providing a dot matrix of nine dots arranged in three rows and three columns, wherein said one dot is in the center of the matrix;

(b) determining a maximum density value of a middle row of said matrix;

(c) determining a minimum density value of each of upper and lower rows of said matrix; and (d) comparing the values determined in steps (b) and (c) and selecting the greatest of said values and plotting said greatest value as the density value of said one dot if said one dot is not to be masked in said staggered printing system.

6. A method for reducing moiré effects for a plurality of dots to be thermally printed, the dots including a centrally located dot about which are positioned a plurality of adjacent neighbor dots, the method comprising the steps of:

determining a plurality of edge density difference values between a value of the centrally located dot and values of the adjacent neighbor dots, respectively;

checking a first condition of whether all of the edge density difference values are less than a first reference value;

checking, if the first condition is satisfied, a second condition of whether the value of the centrally located dot is less than a second reference value;

checking, if the second condition is satisfied, a third condition of whether each of a subset of the plurality of edge difference values is greater than a third reference value;

determining, if the third condition is satisfied, a set of row density values;

checking a fourth condition of whether the centrally located dot belongs to an odd row and an odd column or an even row and an even column or an even row and an odd column or an odd row and an even column; and setting, if the fourth condition is satisfied, a density value of the centrally located dot to a third predetermined reference value.

7. The method as in claim 6, further comprising:

setting, if any of the first, second, and third conditions are not satisfied, the value of the centrally located dot to a maximum value.

8. The method as in claim 6, wherein the step of determining a set of row density values includes:

determining, for a plurality of dots in a row, one of a minimum density value and a maximum density value; and setting the row density value to be the minimum or maximum value determined for the row.

9. The method as in claim 6, wherein the step of determining a set of row density values includes:

determining a value of the centrally located dot, as a function of the row density values, to be retained if the fourth condition is not satisfied.

10. The method as in claim 9, wherein the step of determining a value of the centrally located dot as a function of the row density values includes:

determining, for the row density values, one of a minimum density value and a maximum density value; and setting the value of the centrally located dot to be the minimum or maximum value determined for the row.

11. The method as in claim 6, further including the step of plotting the centrally located dot in a density pattern so that there is present a uniform white line equal in width to one dot.

* * * * *